United States Patent
Oh et al.

(10) Patent No.: US 10,917,006 B1
(45) Date of Patent: Feb. 9, 2021

(54) ACTIVE BURST ZVS BOOST PFC CONVERTER

(71) Applicant: Apple Inc., Cupertino, CA (US)

(72) Inventors: InHwan Oh, Cupertino, CA (US); Bharat K. Patel, San Jose, CA (US); Abby Cherian, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/671,387

(22) Filed: Nov. 1, 2019

(51) Int. Cl.
| | |
|---|---|
| *H02M 1/42* | (2007.01) |
| *G05F 1/70* | (2006.01) |
| *H02M 7/217* | (2006.01) |
| *G05F 1/565* | (2006.01) |
| *H02M 7/219* | (2006.01) |
| *H02M 1/08* | (2006.01) |
| *H02M 7/06* | (2006.01) |
| *H02M 1/44* | (2007.01) |

(52) U.S. Cl.
CPC ......... *H02M 1/4225* (2013.01); *H02M 1/083* (2013.01); *H02M 7/06* (2013.01); *G05F 1/565* (2013.01); *G05F 1/70* (2013.01); *H02M 1/44* (2013.01); *H02M 7/217* (2013.01); *H02M 7/219* (2013.01)

(58) Field of Classification Search
CPC ........ G05F 1/565; G05F 1/70; H02M 1/4225; H02M 7/217; H02M 7/219
USPC .................. 323/284, 285; 363/78, 79, 88, 89
See application file for complete search history.

(56) References Cited

U.S. PATENT DOCUMENTS

| | | | | |
|---|---|---|---|---|
| 9,819,283 | B2* | 11/2017 | Mandavikhah | H02M 1/4225 |
| 2010/0110739 | A1* | 5/2010 | Nishikawa | H02M 1/4225 |
| | | | | 363/124 |
| 2012/0293141 | A1* | 11/2012 | Zhang | H02M 1/4233 |
| | | | | 323/207 |
| 2014/0043877 | A1* | 2/2014 | Ishii | H02M 1/4208 |
| | | | | 363/84 |
| 2015/0364989 | A1* | 12/2015 | Chung | H02M 1/4225 |
| | | | | 363/44 |
| 2018/0278151 | A1* | 9/2018 | Gritti | H02M 1/4225 |
| 2018/0278181 | A1* | 9/2018 | Afridi | H02M 1/4233 |

* cited by examiner

*Primary Examiner* — Gary A Nash
(74) *Attorney, Agent, or Firm* — Blank Rome LLP

(57) ABSTRACT

A power converter can be configured to convert an AC input voltage into a regulated DC output voltage while maintaining the input current in phase with the rectified AC input voltage. A control circuit of the power converter may be configured to selectively enable switching of at least one switching device of the power converter responsive to a determination that the input voltage is greater than a threshold voltage and to selectively disable switching of the at least one switching device responsive to a determination that the rectified AC input voltage is less than the threshold voltage. The control circuit may be configured to selectively enable and disable switching using an active burst mode signal having a frequency lower than a switching frequency of the converter. The control circuit may be still further configured to operate at least one switching device of the converter in a zero voltage switching condition.

19 Claims, 20 Drawing Sheets

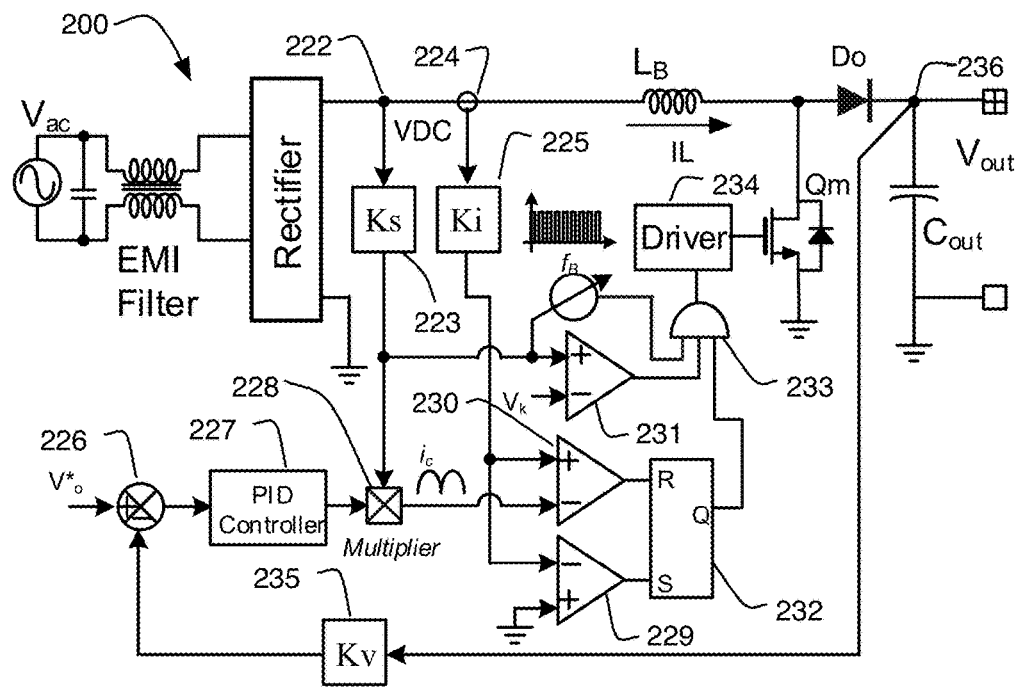
FIG. 2B
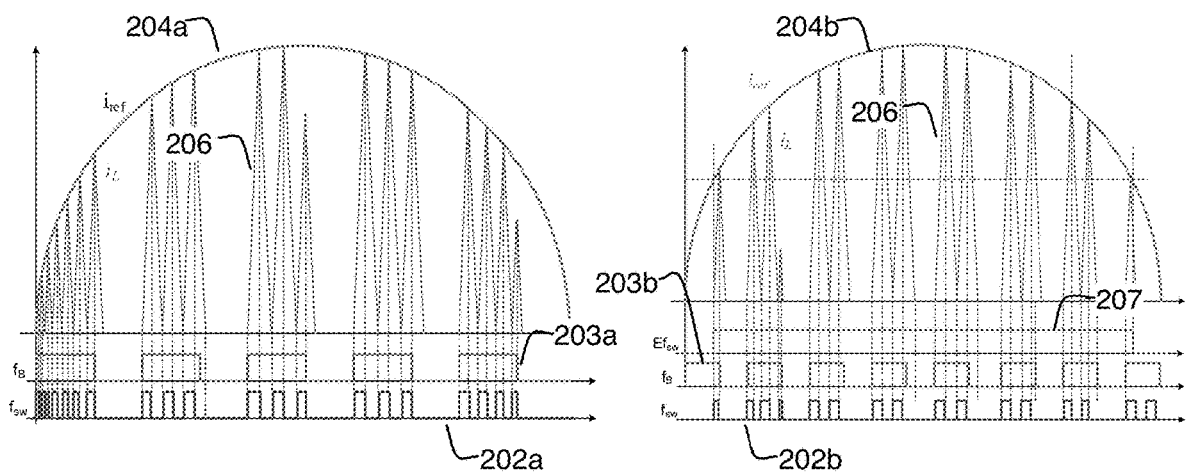
FIG. 2C  FIG. 2D

ACTIVE BURST ZVS BOOST PFC CONVERTER

BACKGROUND

Recently there has been increasing demand for high efficiency, high power density AC-DC converters. For output power ratings of 70 watts or greater, a power factor correction stage may be required. In many applications, a high output voltage boost converter with critical conduction mode (CrM) switching is used to achieve unity power factor. The switching frequency of such a boost/PFC stage is often designed with a widely varied switching frequency that may result in undesirably low frequency operation over at least a part of the operating range. For example, the maximum switching frequency may occur at high Vac line input with low peak current, but the switching frequency becomes very low at low Vac line input with high peak current. As a result, the boost inductor value may be selected so that it has a high enough current rating at low line input voltage. However, the minimum inductance value may be limited by the maximum switching frequency at high line input voltage. Because the switching frequency at low line may be quite low, a large inductance value with a high peak current rating may be required. This can lead to a large physical size for the boost inductor with a somewhat limited switching frequency. Additionally, switching losses may be undesirably high at high line input voltage conditions.

Thus, what is needed are improved boost/PFC converter designs that mitigate these and other design issues to achieve higher operating efficiency and power density.

SUMMARY

An AC/DC power converter can include an input configured to receive an AC input voltage, a rectifier configured to convert the AC input voltage into a rectified AC input voltage, a boost converter configured to receive the rectified AC input voltage and deliver a regulated output voltage, and a control circuit coupled to the boost converter. The control circuit may be configured to monitor the regulated output voltage, an input current of the boost converter, and the rectified AC input voltage. The control circuit may further be configured to switch at least one switching device of the boost converter to deliver the regulated output voltage while maintaining the input current in phase with the rectified AC input voltage. The control circuit may still further be configured to selectively enable switching of the boost converter responsive to a determination that the rectified AC input voltage is greater than a threshold voltage and to selectively disable switching of the boost converter responsive to a determination that the rectified AC input voltage is less than the threshold voltage.

The boost converter of the AC/DC power converter can include a boost inductor having a first terminal coupled to the rectified AC input voltage, a boost switching device coupled between a second terminal of the boost inductor and ground, and a boost rectifier having a first terminal coupled to the second terminal of the boost inductor and a second terminal coupled to an output of the converter. The boost rectifier can be a rectifier switching device switched complementarily to the boost switching device. The rectifier switching device can further be switched complementarily to the boost switching device with a dead time.

The control circuit of the AC/DC power converter may be still further configured to selectively enable and disable switching of the boost converter using an active burst mode signal having a frequency lower than a switching frequency of the boost converter. The active burst mode signal may be zero if the input voltage is below the threshold voltage, which may be zero or non-zero. The control circuit may be still further configured to operate at least one switching device of the boost converter in a zero voltage switching condition. To that end, the power converter may include a zero voltage switching capacitor coupled to the boost converter. The control circuit may thus be configured to control timing of at least one switching device of the boost converter to allow a reverse current through the at least one switching device prior to turn on of the at least one switching device, thereby allowing zero voltage switching of the at least one switching device.

An AC/DC converter circuit can include a first phase including a first high side switch having a first terminal coupled to a DC output terminal of the converter and a second terminal coupled to a first AC input terminal of the converter and a first low side switch having a first terminal coupled to the second terminal of the first high side switch and a second terminal coupled to ground. The AC/DC converter circuit can further include a second phase including a second high side switch having a first terminal coupled to a DC output terminal of the converter and a second terminal coupled to a second AC input terminal of the converter and a second low side switch having a first terminal coupled to the second terminal of the first high side switch and a second terminal coupled to ground. The AC/DC converter circuit can further include at least one inductor coupled between at least one of the first and second AC input terminals and an AC input source. The at least one inductor may include a first inductor coupled between the first AC input terminal and the AC input source and a second inductor coupled between the second AC input terminal and the AC input source.

The AC/DC converter circuit can further include a controller configured to operate the first and second switch phases according to a switching sequence during a positive half cycle of the AC input voltage and operate the first and second switch phases according to a second switching sequence during a negative half cycle of the AC input voltage. The controller may be further configured to selectively enable switching of the first and second switch phases responsive to a determination that an instantaneous value of the AC input voltage is greater than a threshold voltage and selectively disable switching of the boost converter responsive to a determination that the instantaneous value of the AC input voltage is less than the threshold voltage. The switching sequence during a positive half cycle of the AC input voltage may include turning the first high side switch of the first phase off, turning the first low side switch of the first phase on, and switching the second high side switch and second low side switch of the second phase in a critical conduction mode with a negative current limit, thereby achieving zero voltage switching of the second high side switch and second low side switch. The switching sequence during a negative half cycle of the AC input voltage may include turning the second high side switch of the second phase off, turning the second low side switch of the second phase on, and switching the first high side switch and first low side switch of the second phase in a critical conduction mode with a negative current limit, thereby achieving zero voltage switching of the first high side switch and first low side switch.

Alternatively, the switching sequence during a positive half cycle of the AC input voltage can include turning the first high side switch of the first phase on, turning the first low side switch of the first phase off, and switching the second high side switch and second low side switch of the second phase in a critical conduction mode with a negative current limit, thereby achieving zero voltage switching of the second high side switch and second low side switch. In this alternative switching sequence, the switching sequence during a negative half cycle of the AC input voltage can include turning the first high side switch of the first phase on, turning the first low side switch of the first phase off, and switching the second high side switch and second low side switch of the second phase in a critical conduction mode with a negative current limit, thereby achieving zero voltage switching of the second high side switch and second low side switch.

A method of operating an AC/DC converter can include monitoring a regulated output voltage, an input current, and an input voltage of the converter. The method can further include selectively switching at least one switching device to deliver the regulated output voltage while maintaining the input current in phase with the input voltage. The method can still further include selectively enabling switching of the at least one switching device responsive to a determination that input voltage is greater than a threshold voltage and selectively disabling switching of the at least one switching device responsive to a determination that the input voltage is less than the threshold voltage. The threshold voltage may be zero or non-zero. Selectively enabling switching and selectively disabling switching of the at least one switching device comprises can include using an active burst mode signal having a frequency lower than a switching frequency of the boost converter. Selectively switching at least one switching device can include switching the at least one switching device in a zero voltage switching condition.

BRIEF DESCRIPTION OF THE DRAWINGS

FIG. 2B is a schematic of an active burst mode (ABM) boost/power factor correction converter and its control circuit.

FIG. 2C illustrates a conceptual switching duty cycle, reference current, and inductor current for an active burst mode boost/power factor correction converter with active burst mode selectively enabled with reference to a zero threshold voltage.

FIG. 2D illustrates a idealized switching duty cycle, reference current, and inductor current for an active burst mode boost/power factor correction converter with active burst mode selectively enabled with reference to a threshold voltage greater than zero.

DETAILED DESCRIPTION

Figure 1A:
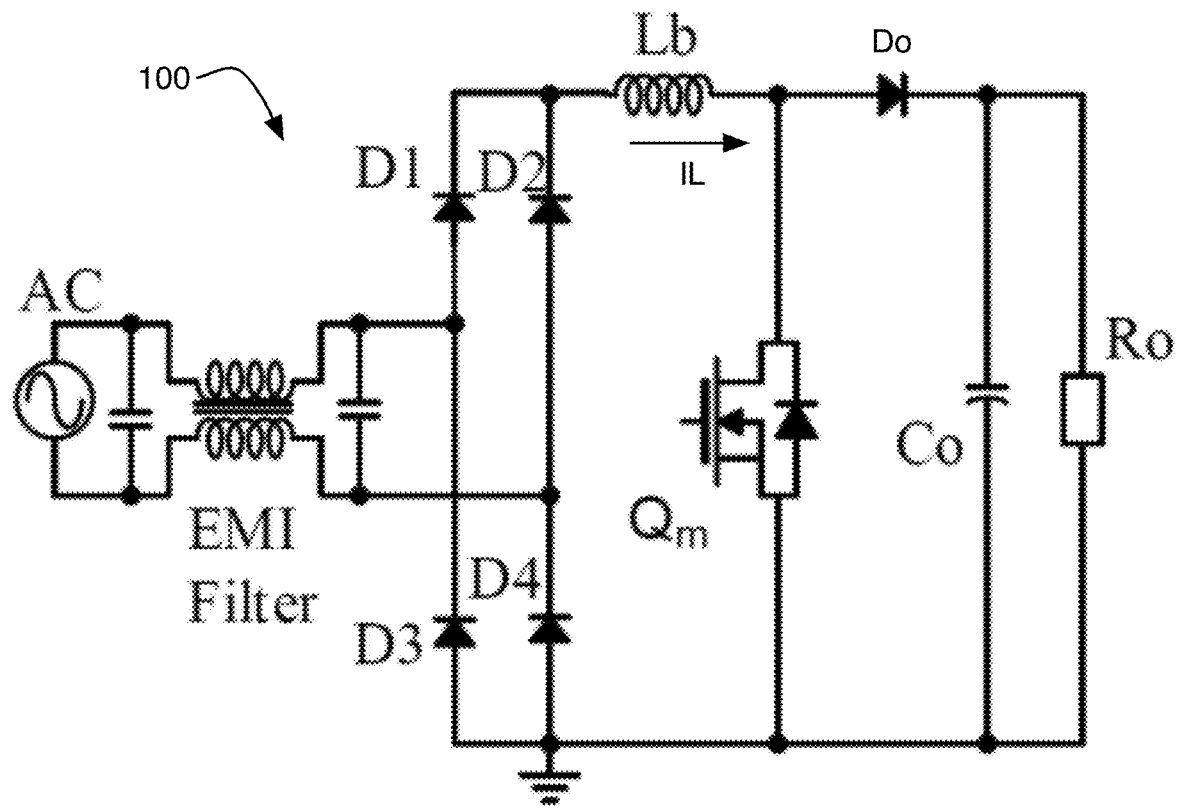
FIG. 1A illustrates a schematic diagram of a boost/power factor correction converter that may be operated in a critical conduction mode.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIGS. 1A-1E illustrate various aspects of an exemplary critical conduction mode boost/power factor correction (boost PFC converter) 100. FIG. 1A illustrates a schematic of the converter. An AC input voltage passes through an (optional) electromagnetic interference (EMI) filter to a rectifier, which, in the illustrated embodiment, is a full bridge rectifier made up of diodes D1-D4. It will be appreciated that other rectifier topologies could alternatively be used. Rectifier D1-D4 produces a full wave rectified voltage that appears across the input of a boost converter made up of boost inductor Lb, boost switching device Qm, and boost diode Do. Switching device Qm may be operated cause boost/PFC converter 100 to draw a substantially sinusoidal current that is substantially in phase with the AC input voltage and produce a DC voltage that is delivered to the load, represented here by output capacitor Co and output resistor Ro.

Figure 1B:
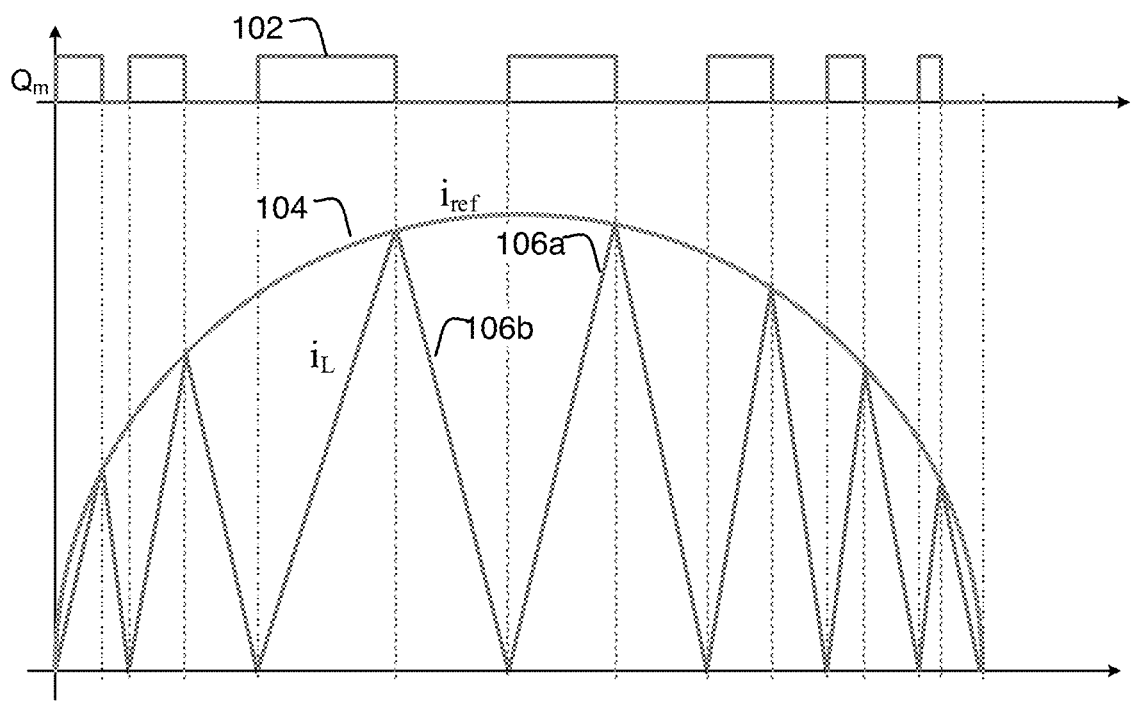
FIG. 1B illustrates an conceptual switching duty cycle, reference current, and inductor current for a boost/power factor correction converter.

FIG. 1B illustrates some aspects of switching Qm to achieve the operations described above. More specifically, waveform 102 illustrates the switching cycles of main switch Qm. When the Qm signal is high, switch Qm may be closed, which cause a current IL (FIG. 1A) to flow through boost inductor Lb, storing energy therein. When the Qm signal is low, switch Qm may be opened, causing boost inductor current IL to flow through boost diode Do to the load. Switch control signal Qm may be generated by a controller (not shown) that compares the boost inductor current IL to a reference current iref (104), which may be a sinusoidal current that is in phase with the AC input voltage. The current window controller may be configured to turn on boost switching device Qm when the boost inductor current IL reaches zero (i.e., the critical conduction mode). As noted above, turning on boost switch Qm generates a linearly increasing current IL, which stores energy in boost inductor Lb. This rising current IL is depicted by the rising slopes 106a illustrated in FIG. 1B. The controller may be further configured to turn off boost switch Qm when the current IL reaches the reference current iref 104. Turning off the switch causes a linearly decreasing current IL, depicted by falling slope 106b as the energy stored in boost inductor Lb is discharged into the load.

Figure 1C:
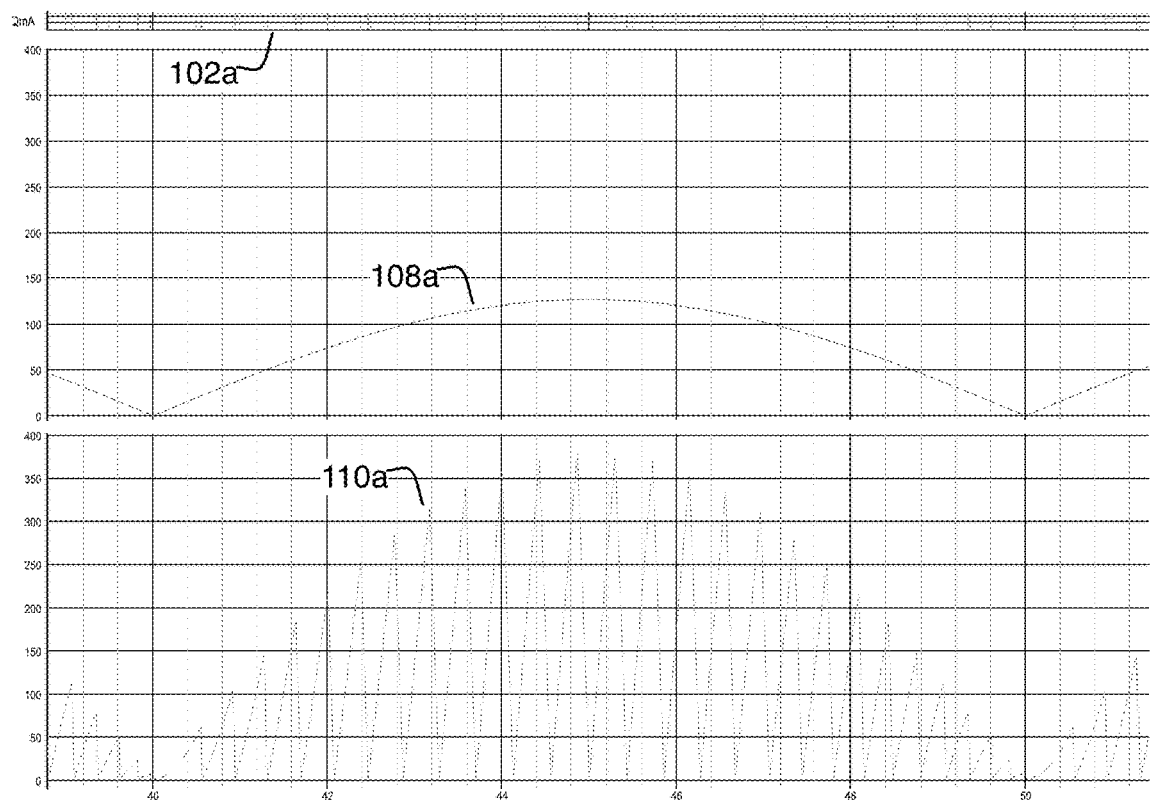
FIG. 1C illustrates a simulated switching duty cycle, reference current, and inductor current for a boost/power factor correction converter operating at a relatively lower input voltage.
Figure 1D:
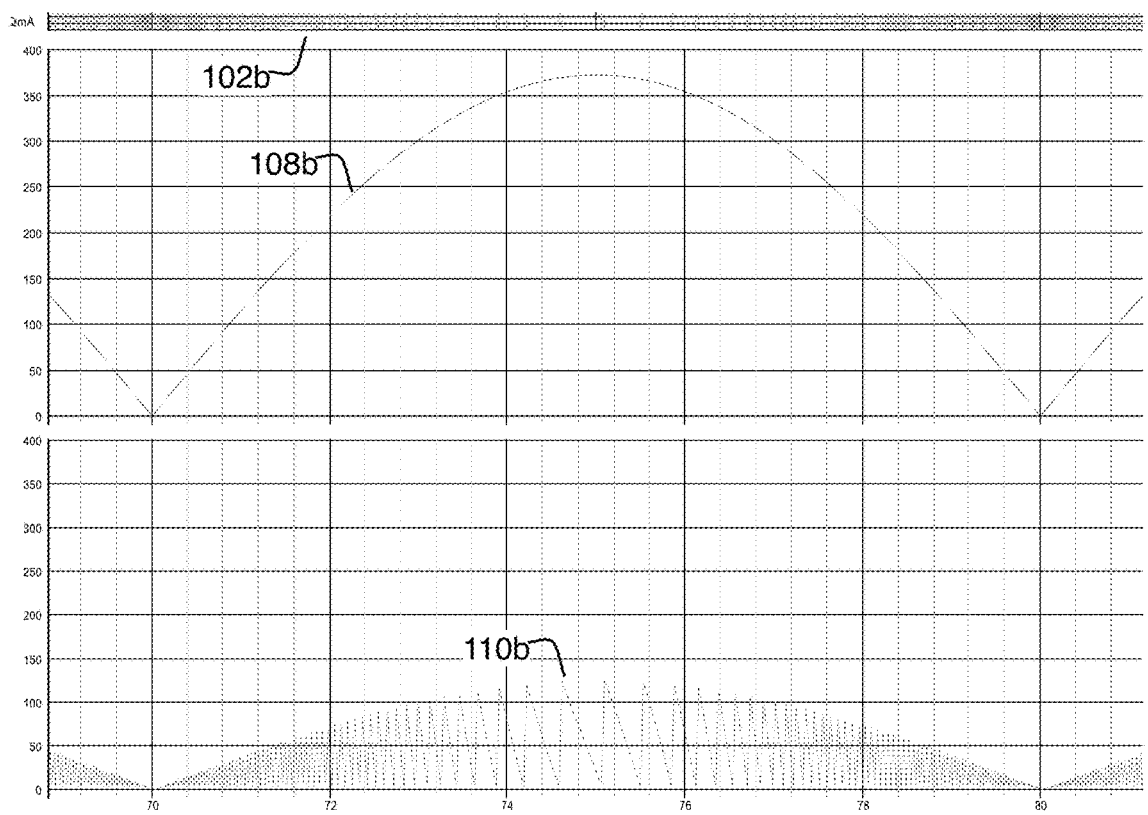
FIG. 1D illustrates a simulated switching duty cycle, reference current, and inductor current for a boost/power factor correction converter operating at a relatively higher input voltage.

Boost/PFC converter 100 may be designed so that it is operable over a range of input voltages. For example, switching power converters designed for operation from normal AC mains supply in different regions of the world may experience input voltages ranging from around 100 Vac to around 240 Vac. FIG. 1C depicts the boost switch control switching signal Qm (102a), the rectified AC input voltage 108a, and the boost inductor current IL (110a) while operating at a low line voltage (e.g., an input voltage of 90 Vac). FIG. 1D depicts corresponding switching signal 102b, corresponding rectified AC input voltage 108b, and corresponding boost inductor current IL (110b) while operating at a high line voltage (e.g., an input voltage of 264 Vac). In each case, boost/PFC converter 100 is delivering the same power. Comparison of the two figures shows that boost inductor current 110a (low voltage) is somewhat larger than boost inductor current 110b (high voltage), as one would expect to deliver the same amount of energy.

Figure 1E:
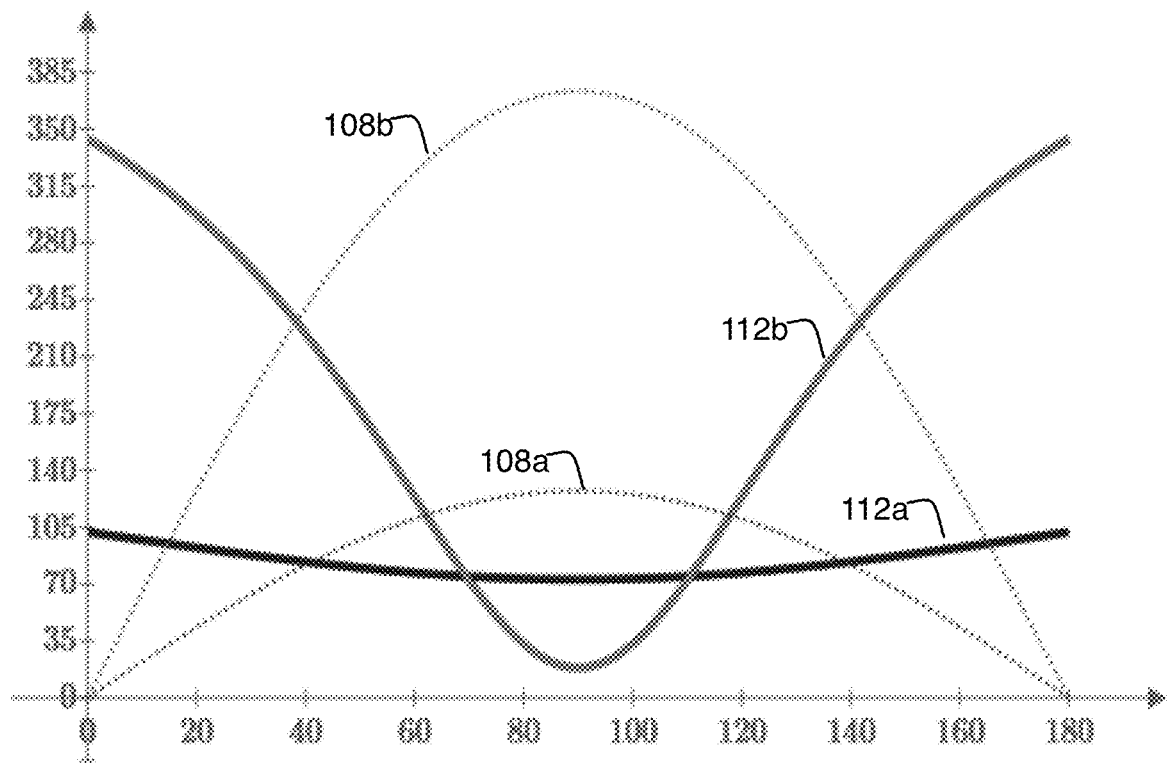
FIG. 1E is a plot of switching frequency versus phase angle over a half cycle of the AC input waveform for a boost/power factor correction converter at relatively lower and relatively higher input voltages.

It will be appreciated that the switching frequency is determined by the inductance value of boost inductor Lb together with input AC voltage and output DC voltage levels. Boost/PFC output voltage is, in at least some embodiments, a design target value selected based on the requirements of downstream components. As a result, the switching frequency becomes a function of the input voltage and boost inductor value. FIG. 1E illustrates high line and low line switching frequency values for an exemplary embodiment using an exemplary loading condition and inductor value. In the plot of FIG. 1E, phase angle of the rectified AC input waveform in degrees is depicted on the horizontal axis, with AC input voltage and/or switching frequency (in kilohertz) depicted on the vertical axis. Curve 108a depicts a low AC input voltage waveform having a peak value around 130V (corresponding to an RMS value of around 90V). Curve 112a depicts a corresponding range of required switching frequencies for a given boost inductance value and loading condition. The required switching frequency thus ranges from about 70 kHz to about 105 kHz. Curve 108b depicts a high AC input voltage waveform having a peak value around 375V (corresponding to an RMS value of around 265V). Curve 112b depicts a corresponding range of required switching frequencies for the same boost inductance value and loading condition. The switching frequency required ranges from around 20 kHz to as much as about 340 kHz. Those skilled in the art will appreciate that limitations on the range of switching frequency that may be practically implemented result, in many cases, in selection of a relatively large inductance value, which leads to large physical sizes for the boost inductor, which may be undesirable in some implementations. Thus, alternative control techniques that circumvent this issue are desired.

Figure 2A:
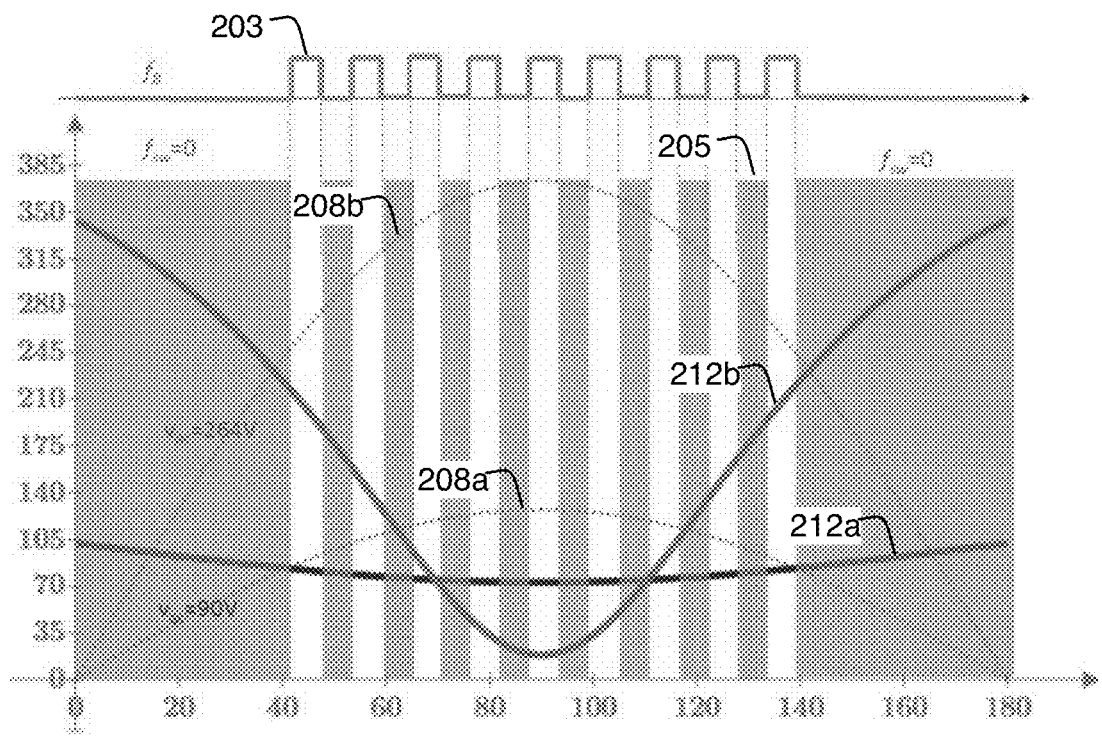
FIG. 2A illustrates a plot of switching frequency versus phase angle over a half cycle of the AC input waveform for a boost/power factor correction converter at relatively lower an relatively higher input voltages with active burst mode control operation.

FIGS. 2A-2D illustrate various aspects of an active burst mode (ABM) controlled boost/PFC converter 200 that may be used to reduce the wide range of required switching frequencies discussed above. With reference to FIG. 2A, active burst mode control for a critical conduction boost/PFC converter introduces an ABM burst frequency fB signal 203 that may be much lower than the switching frequency of boost switch Qm. The duty cycle of ABM burst frequency fB 203 may be controlled or changed to intermittently enable and disable the switching of switch Qm, specifically when the instantaneous rectified AC input voltage is low (i.e, near the zero crossings of the AC input waveform). If ABM burst frequency signal fB is high, main switch Qm may be enabled/allowed to switch at the required switching frequency. Alternatively, if the ABM burst frequency signal fB is low, switching of main switch Qm may be disabled. ABM burst frequency signal fB may be configured to fB becomes zero if the AC input voltage falls below a predetermined design value. With further reference to FIG. 2A, hatched areas 205 indicate where the switching frequency is zero with fB=0, i.e., the regions in which operation of main switch Qm may be disabled. This arrangement can allow for the switching frequency fsw to be limited to a relatively narrower range of relatively high frequencies, allowing for selection of a relatively smaller inductance value for the boost inductor.

FIG. 2B illustrates an exemplary active burst mode (ABM) boost/PFC converter 200 with an exemplary control system. The power conversion stage of the circuit is substantially similar to the boost/PFC converter 100 discussed above. Namely, an AC input voltage Vac is received from an input source, passed through an (optional) EMI filter to a rectifier. The rectified AC input voltage is based to a boost converter made up of boost inductor LB, boost switch Qm, and boost diode Do. Boost switch Qm may be operated as described below to operate in an active burst mode, thereby drawing an AC input current that is in phase with the AC input voltage and producing a desired output voltage Vout across output capacitor Cout at a the output of the converter.

With regard to the control system, ABM boost/PFC converter 200 may include output voltage control and input current control. The output voltage control may include an output voltage sensor 236. Output voltage Vout may be scaled by a voltage loop gain Kv (block 235) and subtracted from an output voltage reference V*o by summer 226. The resulting output voltage error signal may be provided to any suitable controller (e.g., proportional-integral-derivative controller 227). The resulting control signal may be multiplied by the instantaneous input current iC (part of the input current control) at multiplier 228 and passed to a comparator 230 coupled to the reset input of flip flop 232. The input current control may also include current sensor 224, which senses the input current, which may be scaled by current gain Ki (block 225). The scaled input current signal may be applied to comparator 229, which may have its other input grounded, thus becoming an input current zero detector. The output of zero current detector 229 may be provided to the set input of flip flop 232. As a result, the output signal of flip flop 232 will be a control voltage that may be provided to switch driver 234 to generate a control signal for main switch Qm that operates the switch to regulate the output voltage and input current as described above with reference to FIGS. 1A-1E.

The ABM control may also part of the control system. More specifically, the rectified AC input voltage ("VDC") may be sensed by a voltage sensor 222. Likewise, the inductor current IL may be sensed by a current sensor 224. (Many suitable types of voltage and current sensors are known to those skilled in the art and thus are not enumerated or described in detail herein.) The rectified AC input voltage and the inductor current may be used in the control block as follows. Sensing gain Ks (block 223) may be applied to the rectified AC input voltage signal. Sensing gain Ki (block 225) may be applied to the inductor current signal. The scaled/sensed rectified input voltage Vdc sensing voltage may be compared with reference/threshold voltage Vk by comparator 231. (Reference/threshold voltage Vk is discussed in greater detail below with reference to FIGS. 2C and 2D). If VDC is less than Vk then ABM burst frequency signal fb may be set to zero. In such case, the output of comparator 231 is low, providing a low input to AND gate 233, which also receives the fsw signal generated by flip flop 232 discussed above. As a result of the zero input into AND gate 233, a low input is provided to switch driver 234, and main switch Qm is effectively disabled. Otherwise, ABM switching frequency fB (having a selected frequency and duty cycle) may be provided with a selected duty cycle DB. More specifically, if VDC is greater than Vk, a high output is delivered to AND gate 233, allowing switch driver to be triggered whenever fB and fsw are both high.

FIG. 2C illustrates operation of converter 200 when reference/threshold voltage Vk is zero. As noted above, if ABM signal fB (203a, FIG. 2B) is high, fsw signal 202a is allowed to switch boost switch Qm ON or OFF with the switching frequency determined by the control loop as described above. This results in the current pulses 206 as described above. Alternatively, if the burst frequency fB is low, boost switch Qm is not switched.

In some embodiments, it may be desirable for the ABM burst frequency signal fB to become zero if the input voltage is less than a certain design reference/threshold value Vk. FIG. 2D illustrates operation of converter 200 when reference/threshold voltage Vk (207) is non-zero. As noted above, if ABM signal fB (203b, FIG. 2C) is high, fsw signal 202b is allowed to switch boost switch Qm ON or OFF with the switching frequency determined by the control loop as described above. This results in the current pulses 206 as described above. Alternatively, if the burst frequency fB is low, boost switch Qm is not switched.

Figure 3A:
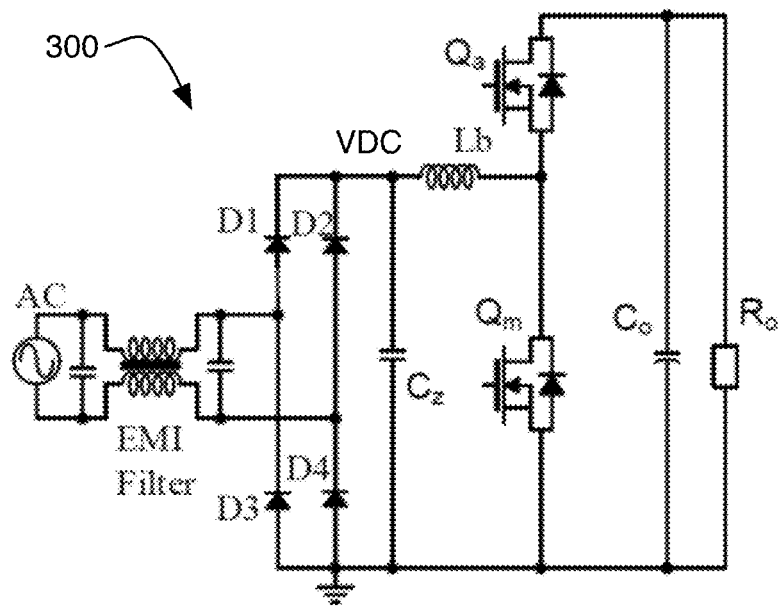
FIG. 3A illustrates a half bridge zero voltage switching (ZVS) active burst mode (ABM) boost/power factor correction converter.

FIG. 3A illustrates an exemplary zero voltage switching (ZVS) active burst mode (ABM) half bridge boost/PFC converter 300. Converter 300 receives an AC input voltage which is passed to a bridge rectifier (made up of diodes D1-D4) via an (optional) EMI filter. The rectified AC input voltage (VDC) appears across a small ZVS capacitor Cz that can provide the energy required for ZVS switching as described below. The rectified AC input voltage (VDC) also appears across the input of a half bridge boost/PFC converter made up of boost inductor Lb, main switch Qm, and auxiliary switch Qa. The boost/PFC converter may present an output voltage across an output capacitance Co and a load Ro.

Figure 3B:
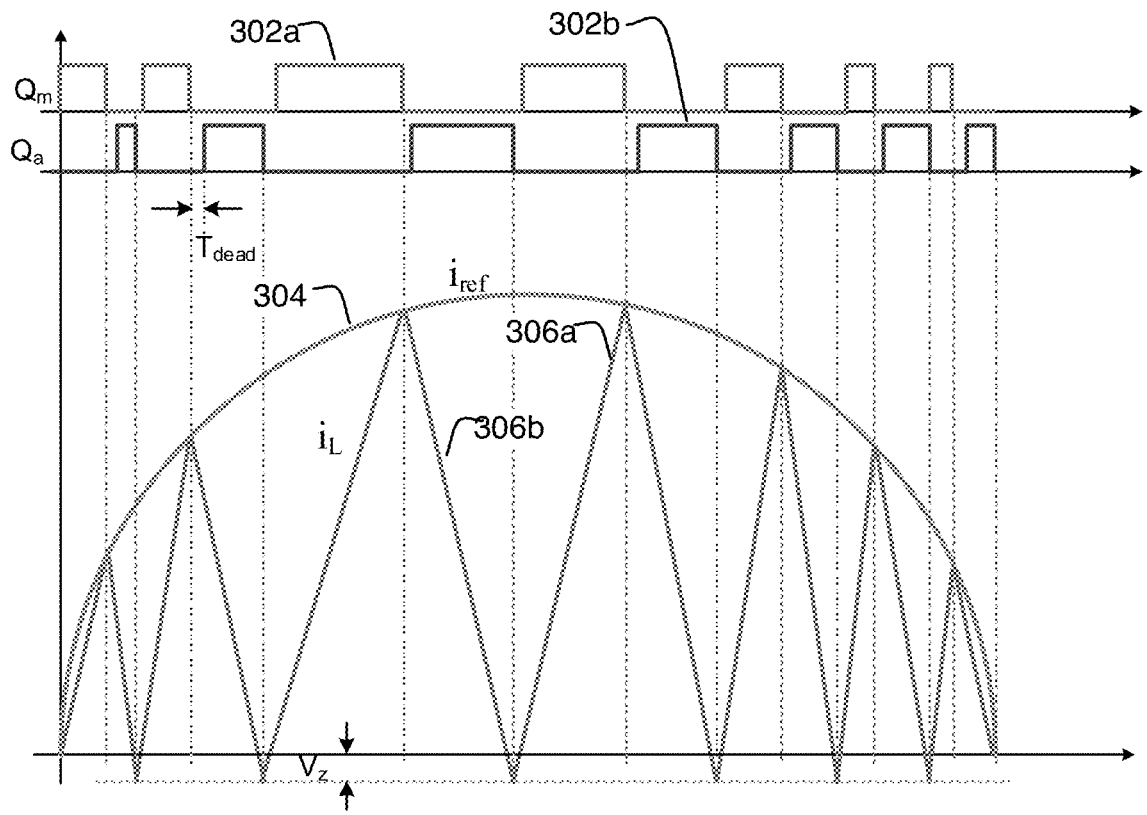
FIG. 3B illustrates conceptual switching duty cycles, reference current, and inductor current for a zero voltage switching (ZVS) active burst mode (ABM) boost/power factor correction converter.
Figure 4:
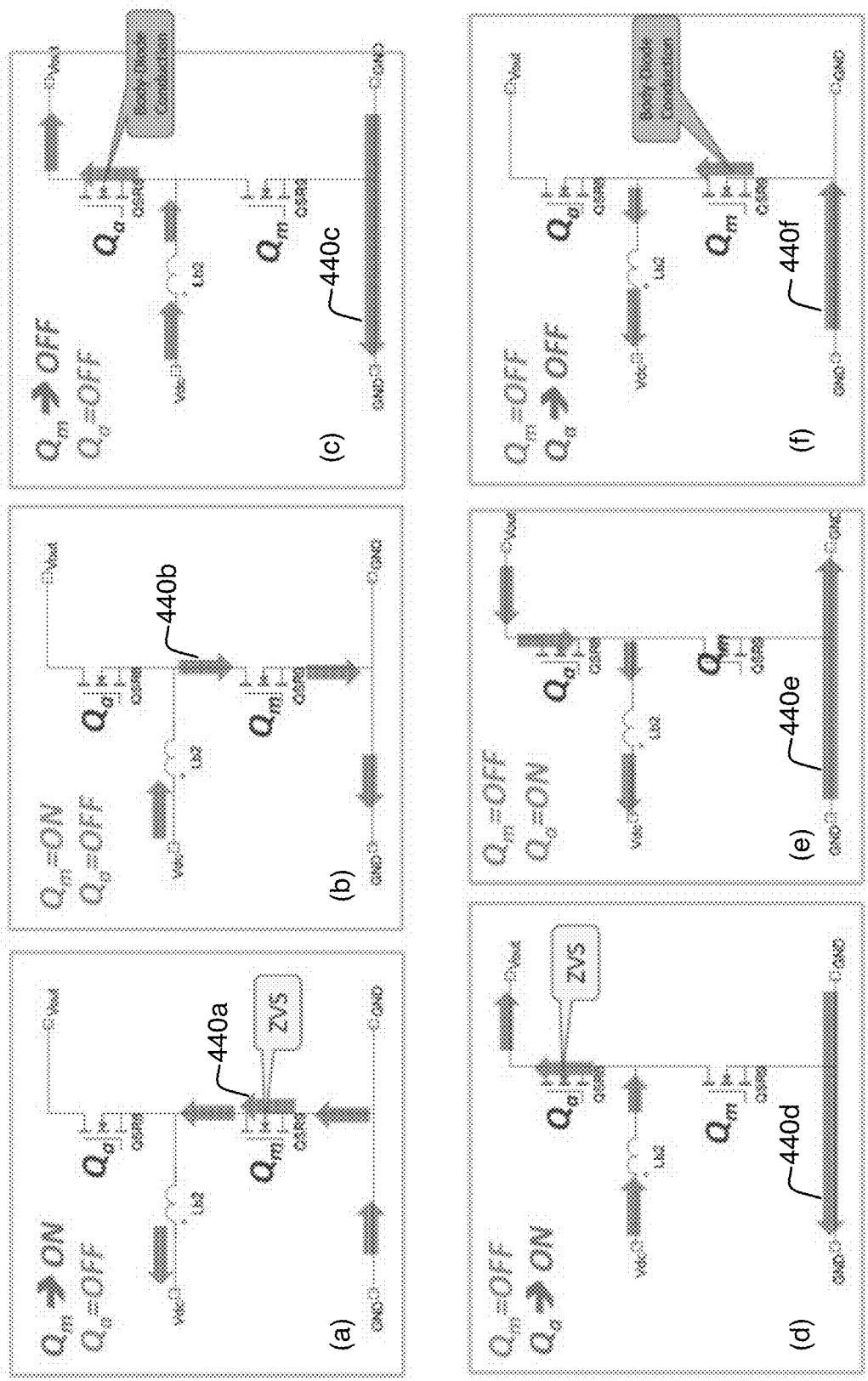
FIG. 4 illustrates a switching sequence for a zero voltage switching (ZVS) active burst mode (ABM) boost/power factor correction converter.

The operating principles of ZVS ABM boost/PFC converter 300 may be understood with reference to FIGS. 3B and 4. FIG. 3B illustrates control signal 302a for main switch Qm, control signal 302b for auxiliary switch 302b, reference current (iref) waveform 304, and boost inductor current (IL) waveform 306a/306b. FIG. 4 illustrates the currents through the converter and emphasizes the ZVS transitions. Main switch Qm may be turned on when control signal 302a is high (block (b) of FIG. 4). This results in a linearly increasing boost inductor current 306a. When boost inductor current IL reaches the reference current (iref) value, main switch Qm may be turned off. Because the current through boost inductor Lb cannot change instantaneously, the boost inductor current begins flowing to the output through the intrinsic body diode of auxiliary switch Qa, as illustrated in block (c) of FIG. 4. Then, after a short suitable delay time (Tdead), auxiliary switch Qa may be turned on in a zero voltage switching (ZVS) condition, as illustrated in block (d) of FIG. 4. Turning on Qa reduces the voltage drop across auxiliary switch Qa, improving efficiency, and switching Qa in a ZVS condition also reduces switching losses associated with this operation. During this interval, boost inductor current IL may be linearly decreasing (306b). Auxiliary switch Qa thus replaces boost diode Do and may improve the efficiency of the circuit because it may have a lower on resistance than a conventional diode or even a low forward voltage drop diode (such as a Schottky diode).

Once the energy stored in boost inductor Lb has discharged to the load, boost inductor current IL becomes zero and may reverse/be driven negative by capacitor Cz as illustrated in the lower portion of FIG. 3B and block (e) of FIG. 4. Auxiliary switch Qa may be turned off at this time, which may result in a current flow through the intrinsic body diode of main switch Qm (block (f) of FIG. 4). This can allow for main switch Qm to be turned on again under a zero voltage condition (block (a) of FIG. 4), which can reduce the switching losses associated with the operation of main switch Qm.

Figure 5:
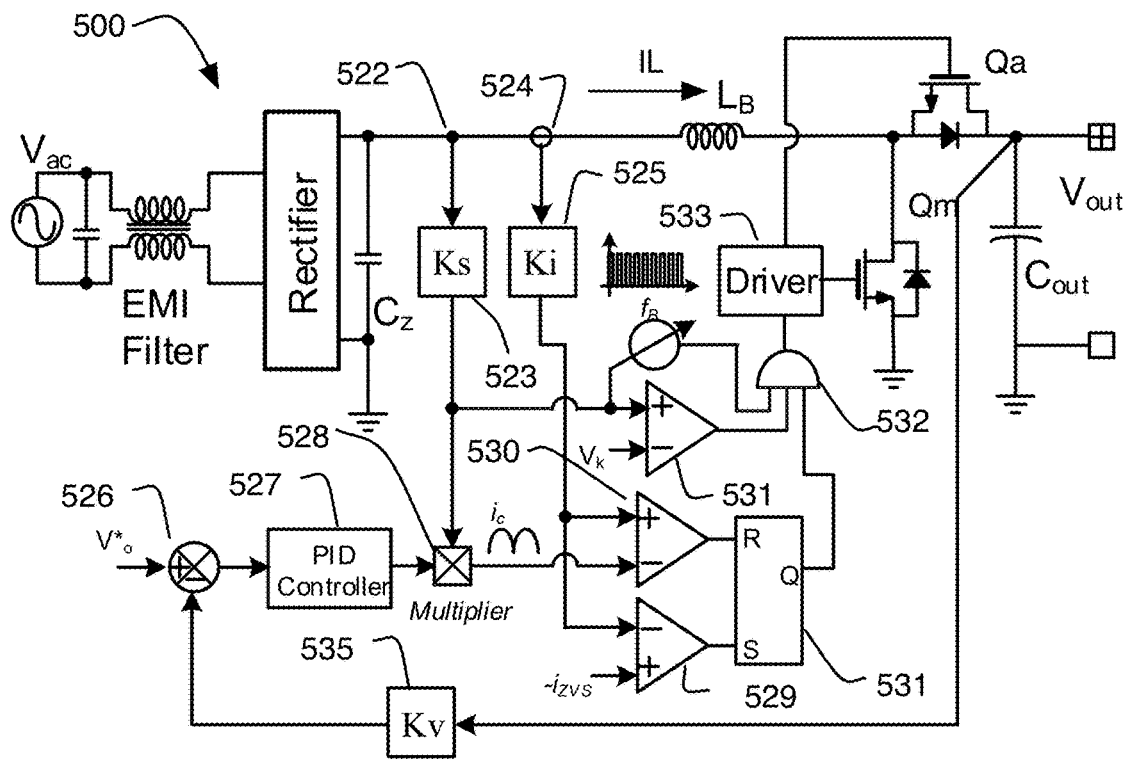
FIG. 5 illustrates a schematic of a half bridge zero voltage switching (ZVS) active burst mode (ABM) boost/power factor correction converter and its control system.

FIG. 5 illustrates ZVS ABM half bridge boost/PFC converter 500, which incorporates the controller of FIG. 2A into the switching topology of FIG. 3A. FIG. 5 includes corresponding reference numbers to FIG. 2A. Additionally, converter 500 operates as described above with reference to FIGS. 2A-4, except that a negative ZVS reference current (−iZVS) is provided to comparator 529. Thus, comparator 529 operates as a negative current limit detector rather than a current zero detector. This allows for the negative boost inductor current flow discussed above that allows for ZVS switching of main switch Qm.

Figure 6:
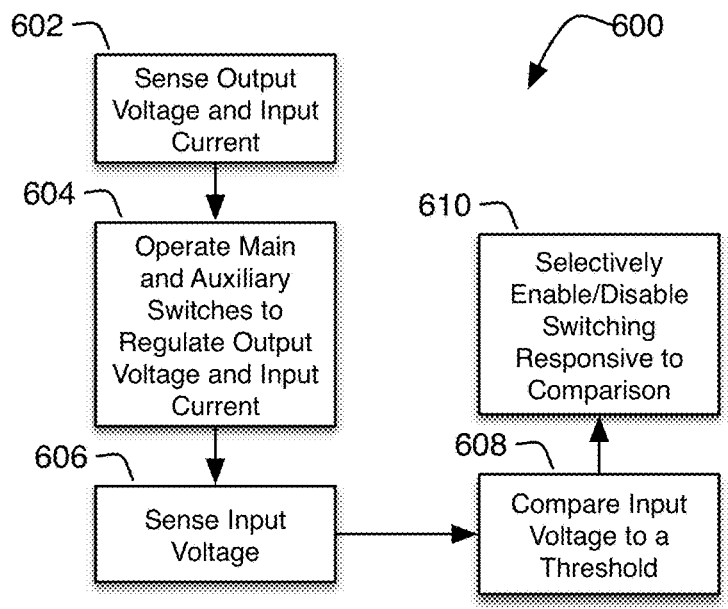
FIG. 6 illustrates a flow chart diagram summarizing a control scheme for an active burst mode boost/power factor correction converter.

FIG. 6 depicts a flow chart 600 summarizing the active burst mode (ABM) control techniques for a PFC/boost converter discussed above. In block 602, the output voltage and input current may be sensed by a controller. In block 604, the controller may operate the main and auxiliary switches to regulate the output voltage and input current. In block 606, the input voltage may be sensed. In block 608, the input voltage may be compared to a threshold. As noted above, the threshold may be zero or a non-zero value. In block 610, the switching operation (i.e., block 604) may be selectively enabled/disabled responsive to the comparison of the input voltage to the threshold.

The flow chart of FIG. 6 may be implemented by any suitable controller, including analog control circuitry, digital control circuitry (including control circuitry using logic gates and similar elements or programmable processors, controllers, microcontrollers, etc.). In some embodiments, the controller may be implemented as hybrid analog/digital circuitry and may, in at least some embodiments, be implemented in an application specific integrated circuit.

Figure 7A:
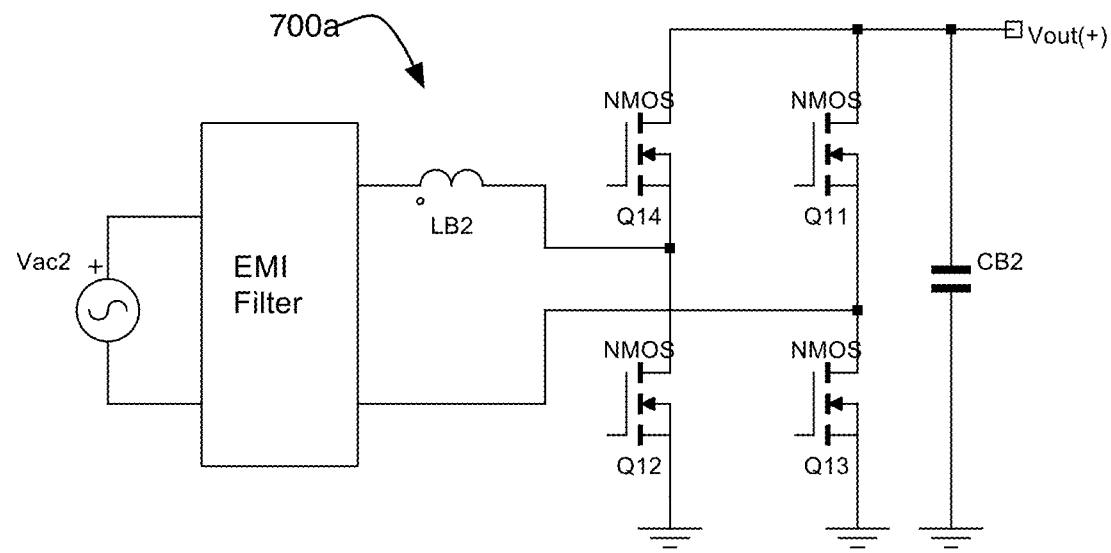
FIG. 7A illustrates a schematic of a full bridge zero voltage switching (ZVS) active burst mode (ABM) boost/power factor correction converter.
Figure 7B:
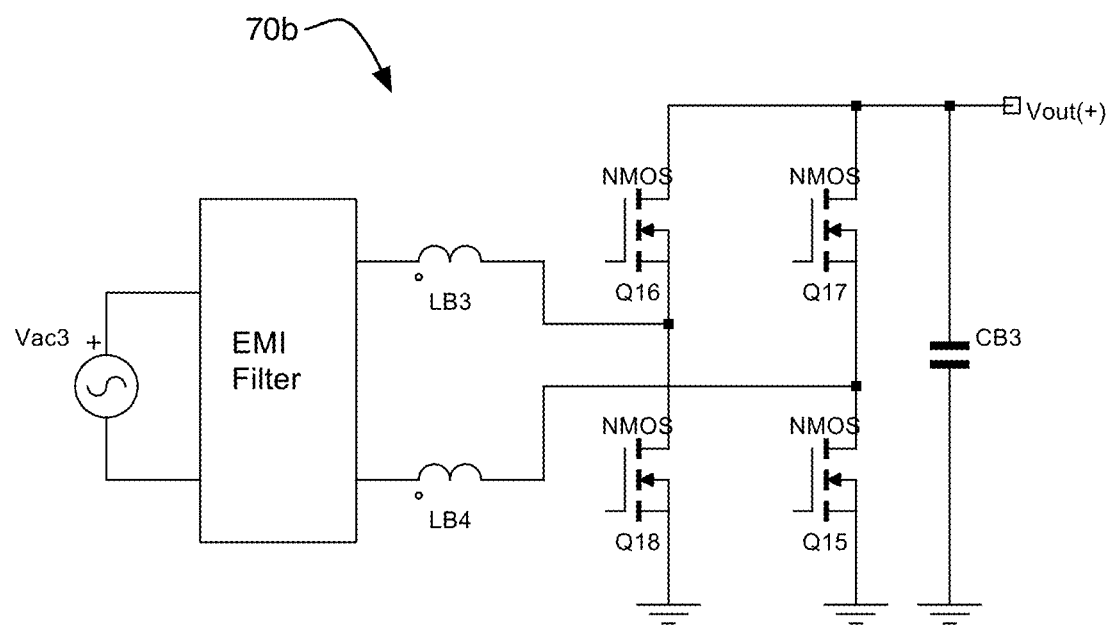
FIG. 7B illustrates an alternative schematic of a full bridge zero voltage switching (ZVS) active burst mode (ABM) boost/power factor correction converter.

FIGS. 7A and 7B illustrate alternative embodiments of ZVS ABM boost/PFC converters that employ a full bridge switching arrangement to eliminate the need for the separate rectifier stage. FIG. 7A illustrates a first embodiment of a Bridgeless ZVS ABM Boost/PFC Converter 700a. In converter 700a, an AC input voltage may be passed through an (optional) EMI filter to a boost inductor LB2. The optionally filtered AC input voltage may be based to a full bridge switching arrangement made up of switches Q11-Q14 by boost inductor LB2. Switches Q11-Q14 form two respective phases, each comprising a high side switch and a low side switch. In subsequent figures and description, switch Q14 is the phase A, high side switch and is denoted QAH. Similarly, switch Q12 is the phase A, low side switch and is denoted QAL. Switch Q11 is the phase B, high side switch and is denoted QBH. Finally, switch Q13 is the phase B, low side switch and is denoted QBL.

Switching bridge Q11-Q14 may be operated as described below to produce a DC output voltage (Vout) that appears across capacitor CB2, which serves both as a filter capacitor and as the energy storage source to achieve zero voltage switching (ZVS) of the switching components as described in greater detail below. FIG. 7B illustrates a second embodiment of a bridgeless ZVS ABM boost/PFC converter 700b. In converter 700b, the boost inductance is provided by separate boot inductors LB3 and LB4 located in each leg of the (optionally filtered) AC input waveform.

Figure 8A:
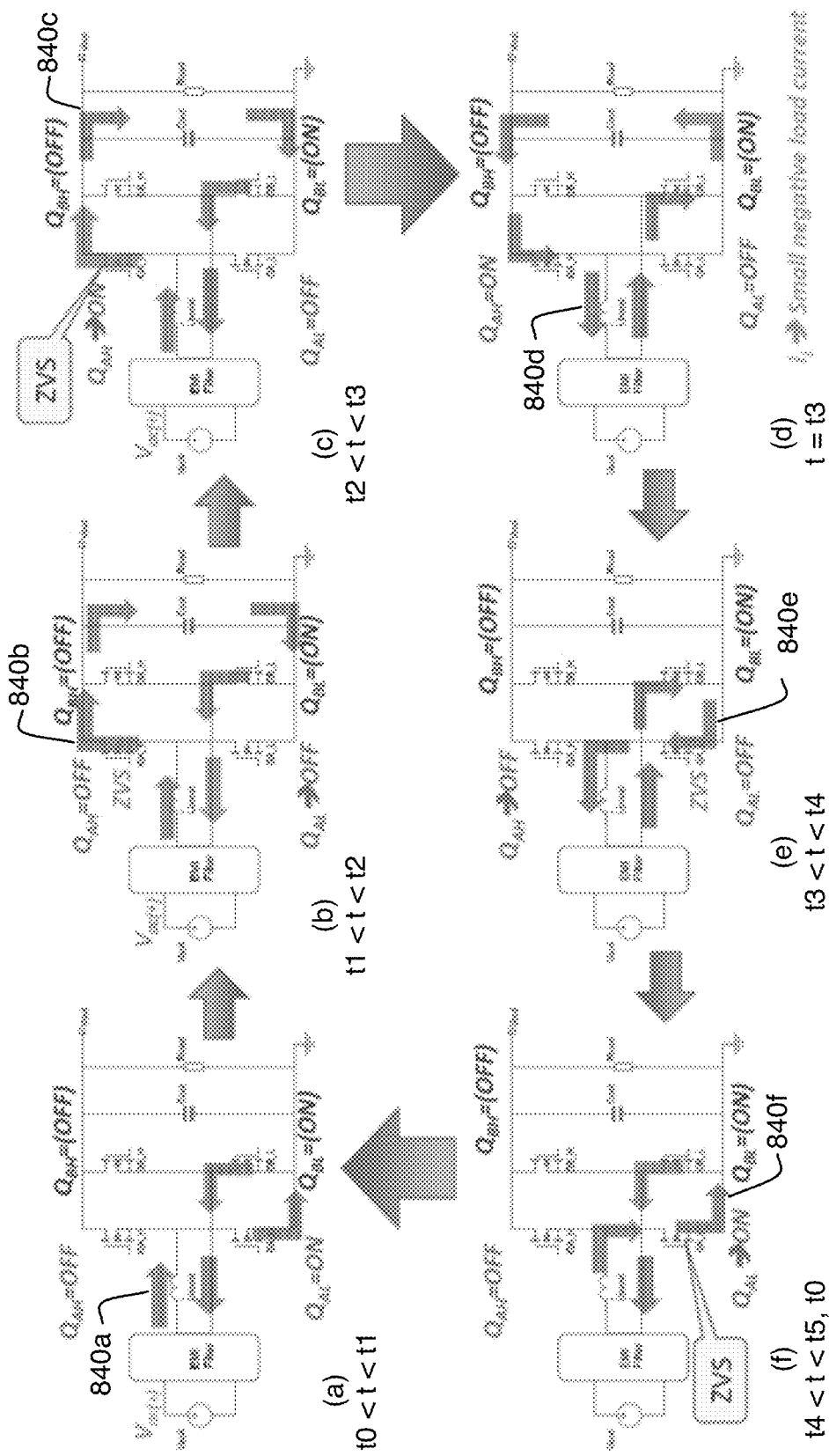
FIG. 8A illustrates a first switching sequence for a full bridge zero voltage switching (ZVS) active burst mode (ABM) boost/power factor correction converter during a positive half cycle of the input current.
Figure 8B:
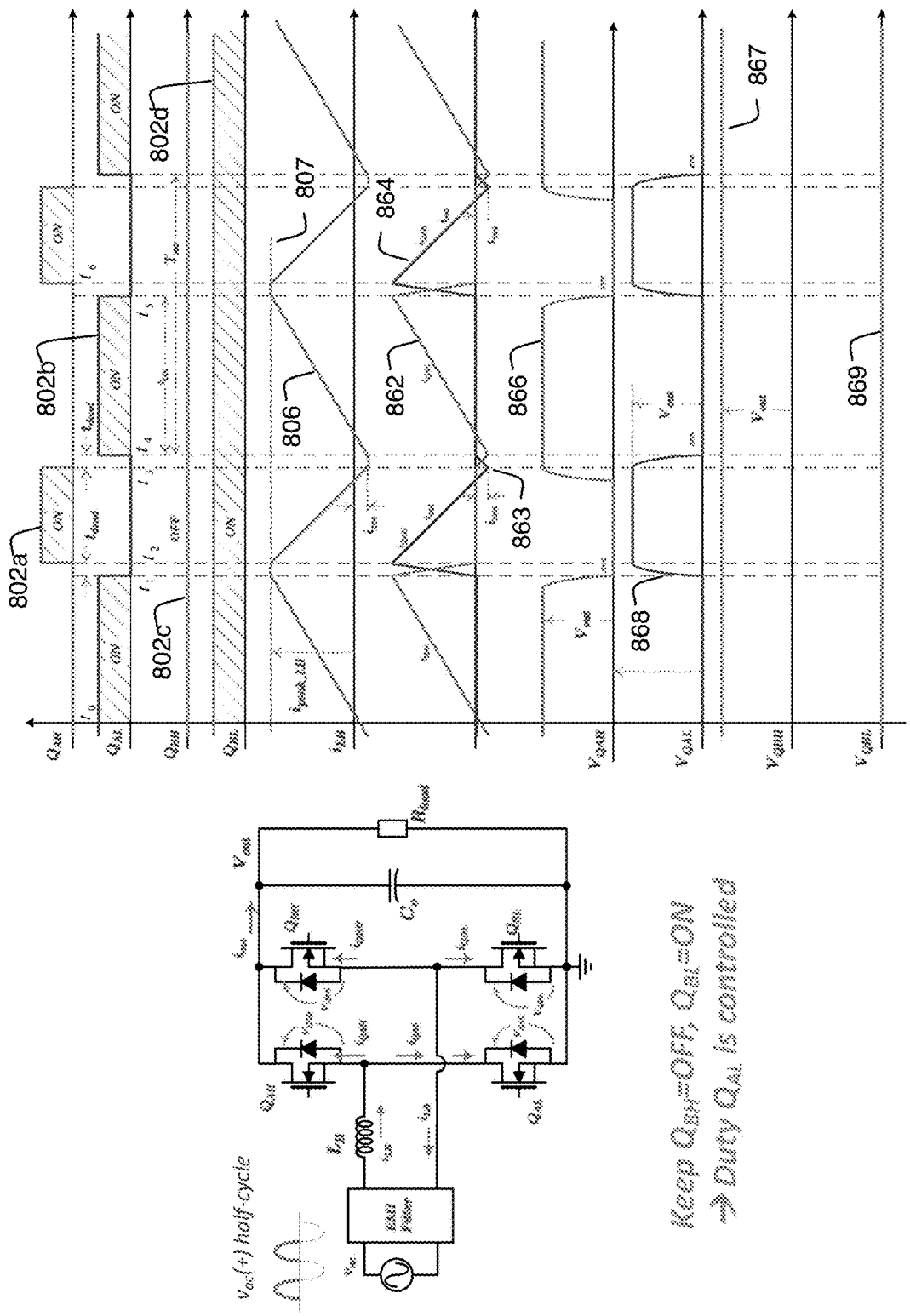
FIG. 8B illustrates various voltages and currents and associated waveforms for the first switching sequence for a full bridge zero voltage switching (ZVS) active burst mode (ABM) boost/power factor correction converter during a positive half cycle of the input current.
Figure 8C:
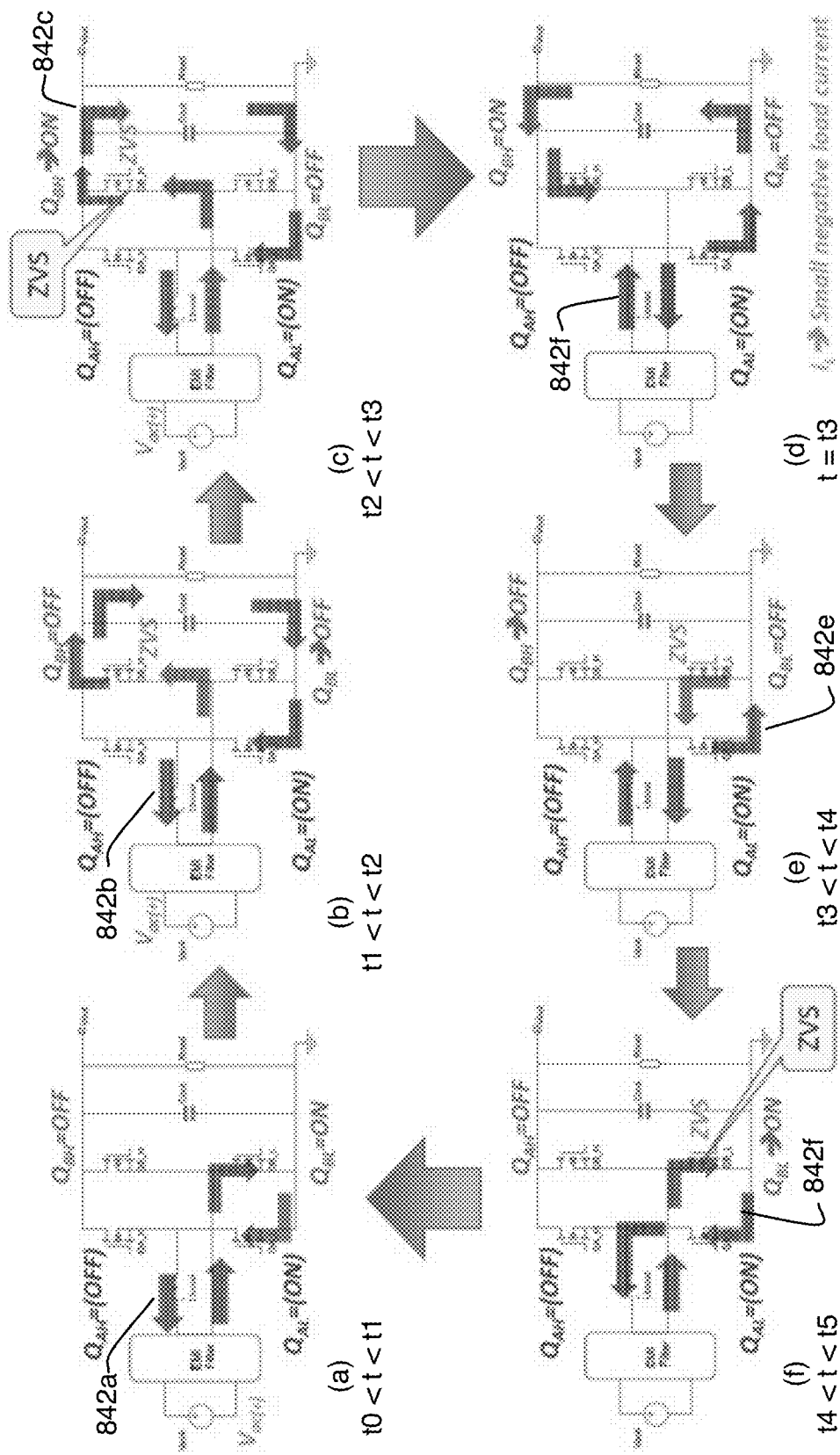
FIG. 8C illustrates a first switching sequence for a full bridge zero voltage switching (ZVS) active burst mode (ABM) boost/power factor correction converter during a negative half cycle of the input current.
Figure 8D:
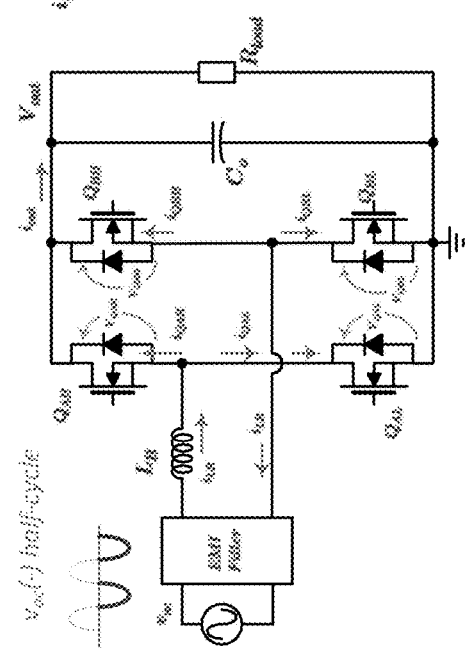
FIG. 8D illustrates various voltages and currents and associated waveforms for the first switching sequence for a full bridge zero voltage switching (ZVS) active burst mode (ABM) boost/power factor correction converter during a negative half cycle of the input current.
Figure 8D:
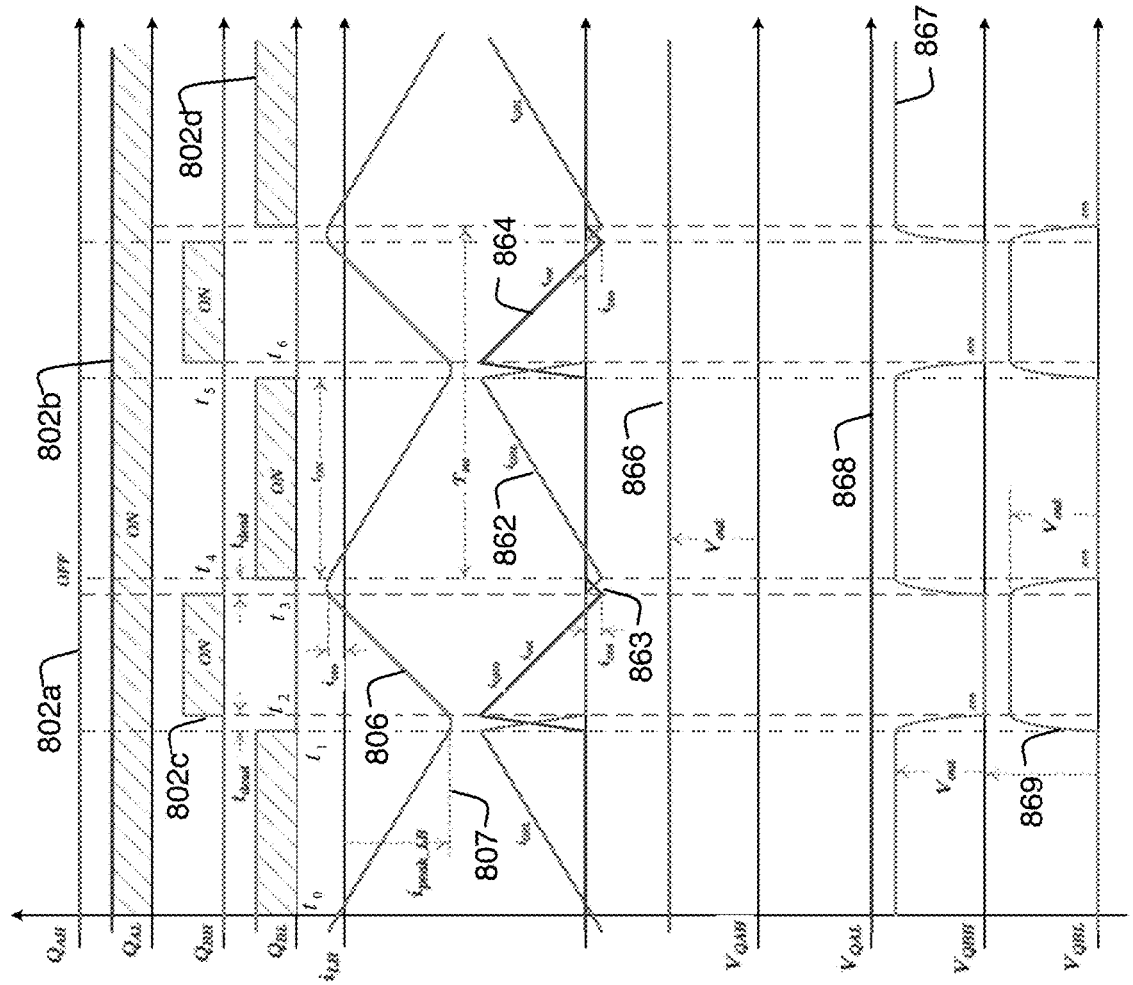
Figure 10A:
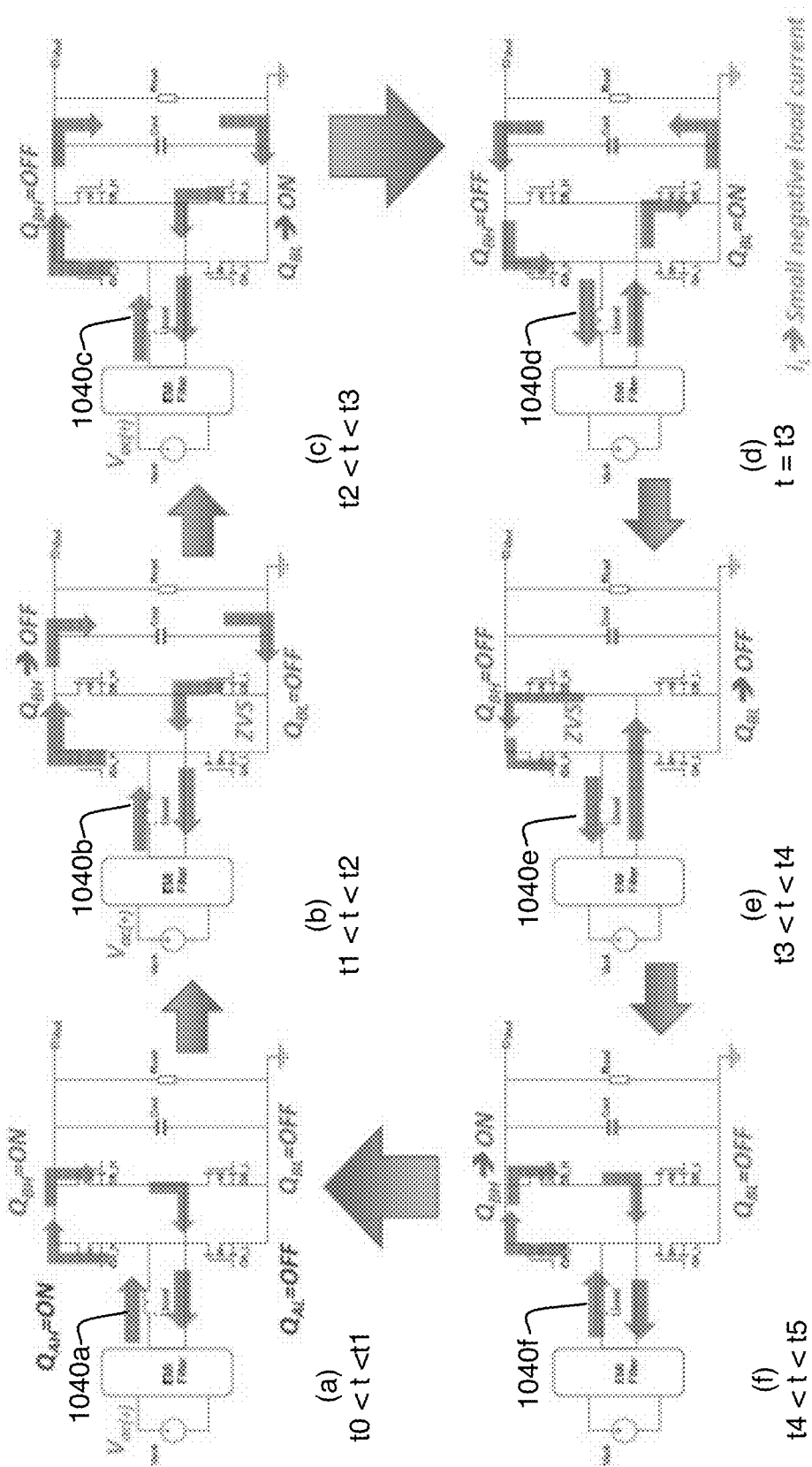
FIG. 10A illustrates a second switching sequence for a full bridge zero voltage switching (ZVS) active burst mode (ABM) boost/power factor correction converter during a positive half cycle of the input current.
Figure 10B:
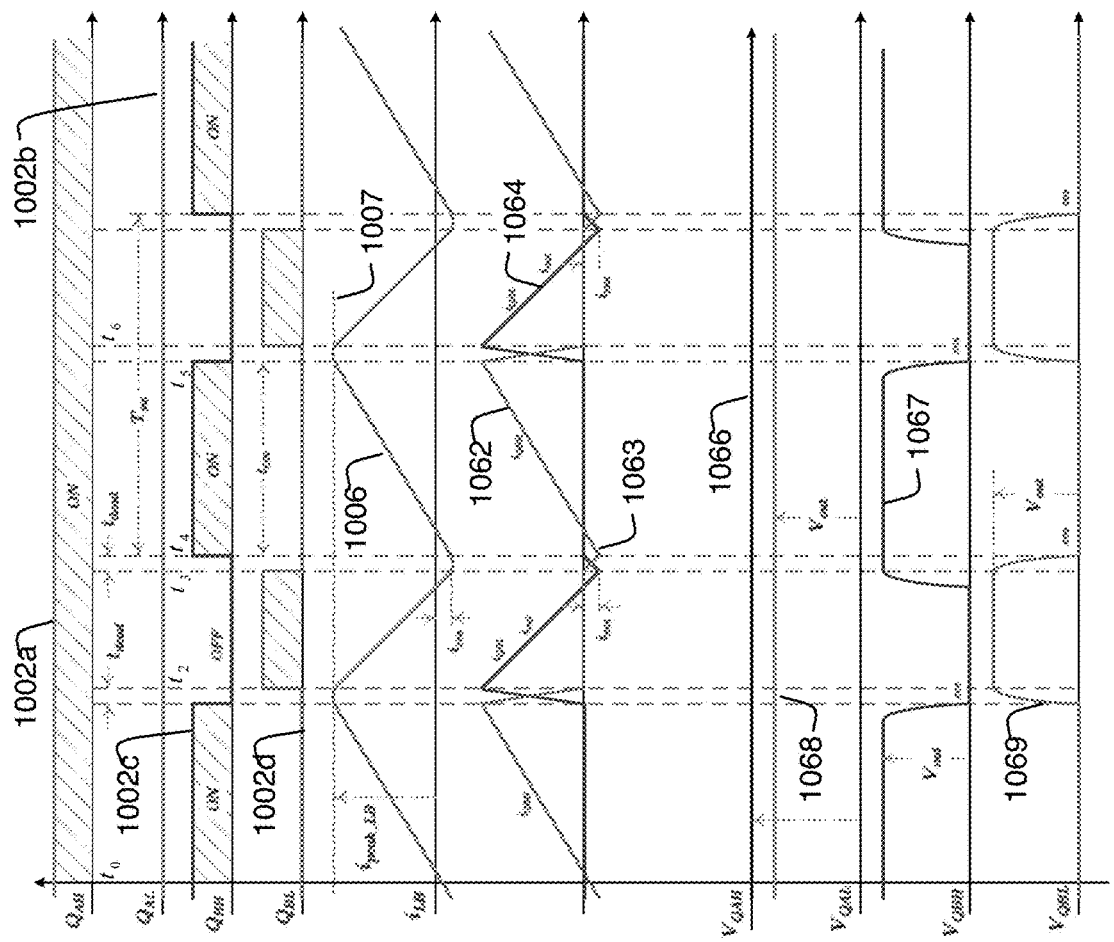
FIG. 10B illustrates various voltages and currents and associated waveforms corresponding to the second switching sequence a full bridge zero voltage switching (ZVS) active burst mode (ABM) boost/power factor correction converter during a positive half cycle of the input current.
Figure 10B:
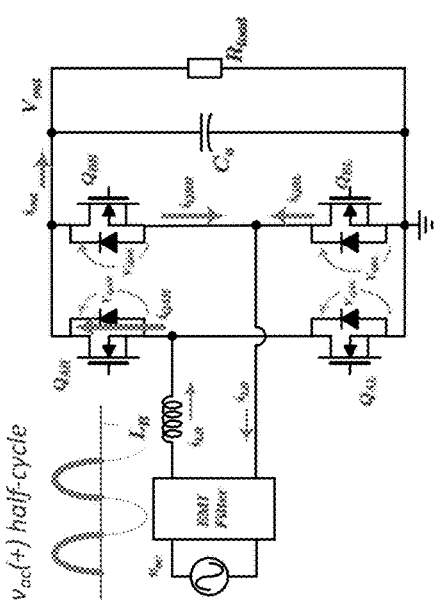
Figure 10C:
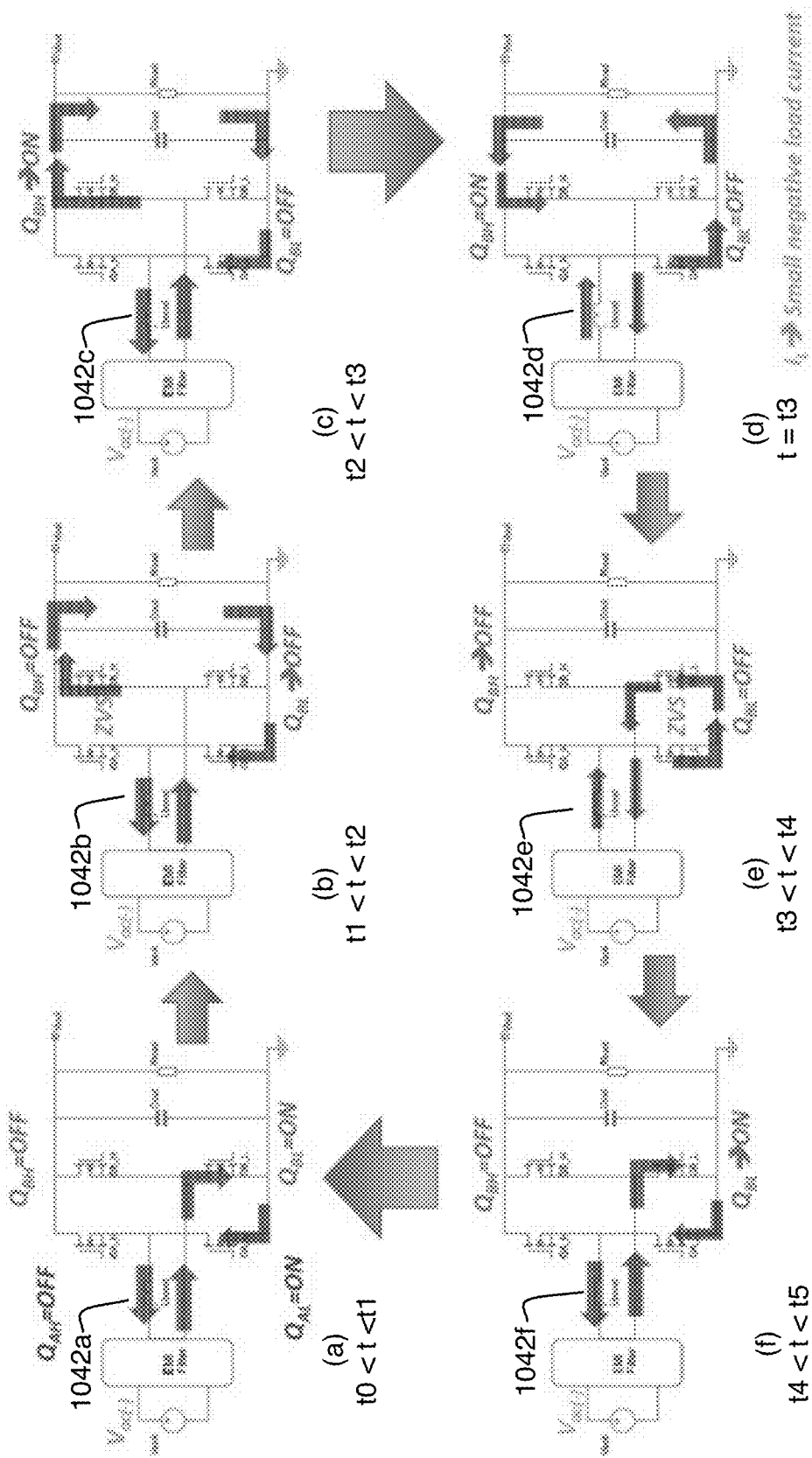
FIG. 10C illustrates an second switching sequence for a full bridge zero voltage switching (ZVS) active burst mode (ABM) boost/power factor correction converter during a negative half cycle of the input current
Figure 10D:
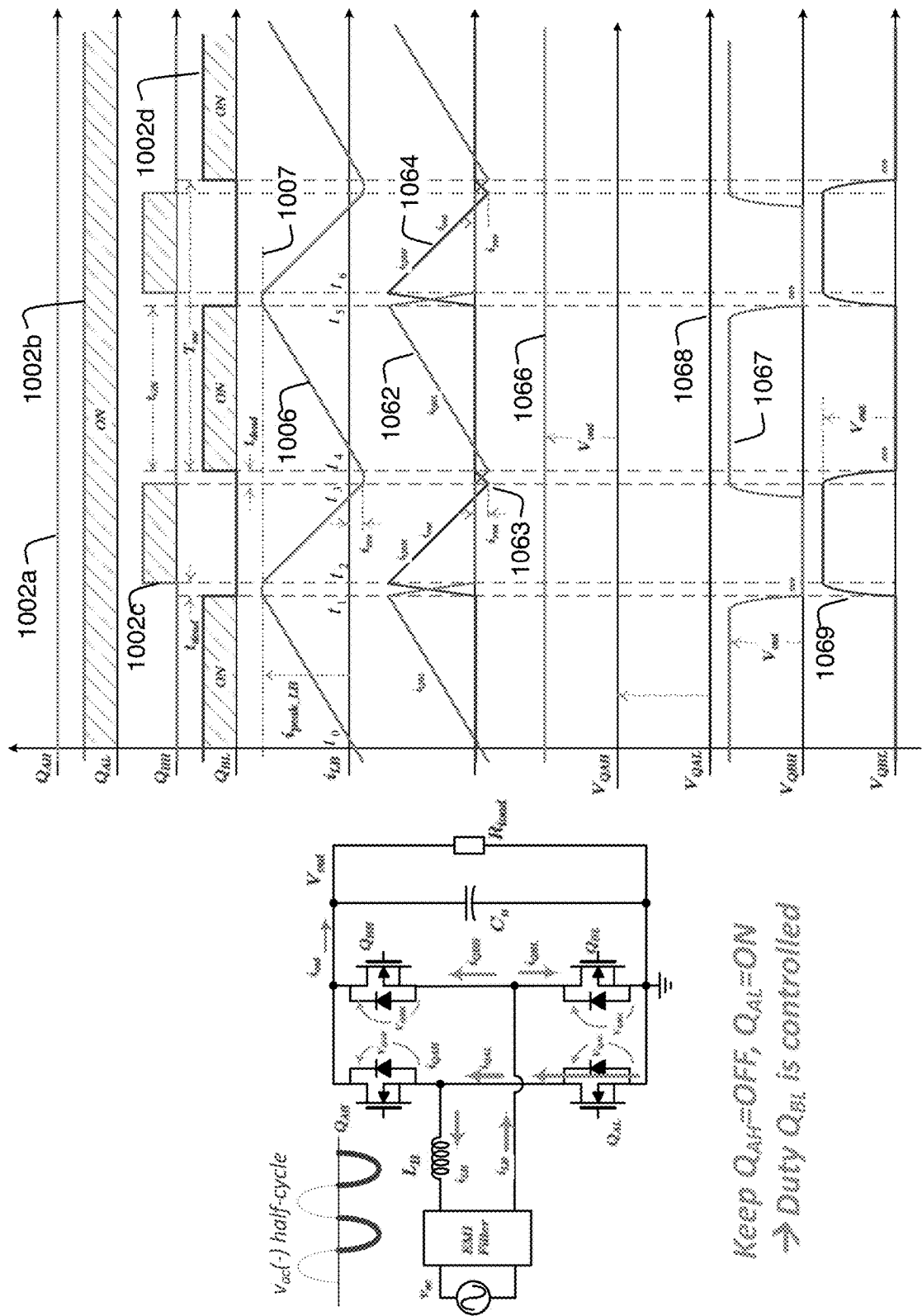
FIG. 10D illustrates various voltages and currents and associated waveforms corresponding to the second switching sequence a full bridge zero voltage switching (ZVS) active burst mode (ABM) boost/power factor correction converter during a negative half cycle of the input current.

FIGS. 8A-8D illustrate a first control scheme for a bridgeless ZVS ABM boost/PFC converter. FIGS. 10A-10D illustrate a second control scheme for a bridgeless ZVS ABM boost/PFC converter. With reference to the first control scheme, FIGS. 8A and 8B illustrate the switching operation during a positive half cycle of the AC input waveform, and FIGS. 8C and 8D illustrate the switching operations during a negative half cycle of the AC input waveform. With reference to the second control scheme, FIGS. 10A and 10B illustrate the switching operation during a positive half cycle of the AC input waveform, and FIGS. 10C and 10D illustrate the switching operations during a negative half cycle of the AC input waveform.

Turning now to FIGS. 8A and 8B, the positive half cycle switching sequence for the first control scheme is illustrated. During the positive half cycle of the first switching scheme, switch QBH will remain off, switch QBL will remain on, and switches QAH and QAL will be alternately switched to provide a desired output voltage Vout and power factor correction to the input. The positive half cycle switching sequence may be initiated in block (a) of FIG. 8A with the two lower side switches QAL and QBL closed. Block (a) illustrates the time period depicted in FIG. 8B beginning at zero and extending until time t1. Because both low side switches QAL and QBL are turned on, a current 840a may flow from the AC input, through boost inductor LB, through turned on switch QAL, through turned on switch QBL, returning to the AC input source. This results in the linear increase of boost inductor current iLB (806) depicted in FIG. 8B. As can be further seen with reference to FIG. 8B, the drive signals 802b and 802d for switches QAL and QBL are high during time period (a). Additionally, the current through low side switch QAL (862) linearly increases, and the output voltage Vout appears across high side switches QAH (as illustrated by voltage waveform 866).

When the boost inductor current iLB reaches the peak current reference value 807 (FIG. 8B), at time t1, switch QAL may be turned off beginning time period (b), which extends from time t1 until time t2. During period (b), current 840b continues flowing through the boost inductor (iLB), through the intrinsic body diode of switch QAH, through the load (iL), returning to the AC input via switch QBL. As shown in FIG. 8B, the drive signal 802d for switch QBL remains high during period (b) while all other switch drive signals (802a, 802b, and 802c) remain low. The inductor current iLB (806) begins decreasing, which corresponds to a decrease in the current through low side switch QAL (862) and an increase in the current through high side switch QAH (waveform 864). The output voltage Vout appears across switch QBH (waveform 867), and the voltage across switch QAH ramps down to zero (waveform 866) while the voltage across switch QAL ramps up to Vout (waveform 868).

As noted above, by time t2, current is established through the intrinsic body diode of switch QAH. This allows switch QAH to achieve zero voltage turn on at time t3, beginning time period (c). During time period (c), current 840*c* continues to flow through switch QAH, through the load, returning to the AC input via switch QBL. As a result, boost inductor LB is discharged, as illustrated by the falling current waveform 806 during period (c). This down-ramping current also flows through switch QBL (waveform 864). As a result, during time period (c), there is zero voltage across switches QAH and QBL, with the output voltage appearing across switches QAL (waveform 868) and QBH (waveform 867).

As in the embodiments discussed above, boost inductor current iLB and load current iload may be permitted to achieve a slight negative value 863, driven by capacitor output Co, indicating the beginning of time period (d) which is the brief period around time t3. As illustrated in block (d) of FIG. 8A, the negative boost inductor current 840*c* flows from the AC input, through switch QBL (which remains turned on), through the load, returning through inductor Lb to the AC input. With reference to FIG. 8B, during time period (d), drive signal 802*d* (for switch QBL) remains high, with drive signals 802*a* (for switch QAH), 802*b* (for switch QAL), and 802*c* (for switch QBH) remaining low. (Switch QAH may be turned off at the time t3, i.e., the beginning of time period (d).) Boost inductor current iLB remains at its slight negative value (waveform 806), and the output voltage transitions to appearing across switch QAH (waveform 866) and switch QBH (waveform 867), while the voltage across switch QAL transitions from Vout to zero (waveform 868).

With switch QAH turned off, negative boost current 840*e* flows as illustrated in time period (e) which extends form time t3 until time t4 at which point switch QAL is turned on in a ZVS condition. During period (e), the negative boost inductor current 840*e* flows from the AC source through turned on switch QBL, through the intrinsic body diode of switch QAL, through boost inductor LB, back to the AC input. The reverse current flow through the body diode of switch QAL allows QAL to be turned on in a ZVS condition at time t4, marking the beginning of time period (f), which runs from time t4 until time t5 (which corresponds to the beginning of the switching cycle, i.e., time t0). Once switch QAL is turned on, positive current 840*f* flows from the AC input, through boost inductor LB, through switch QAL, returning through QBL to the AC input. Corresponding waveforms are illustrated in FIG. 8B.

Turning now to FIGS. 8C and 8D, the negative half cycle switching sequence for the first control scheme is illustrated. During the negative half cycle of the first switching scheme, switch QAH will remain off, switch QAL will remain on, and switches QBH and QBL will be alternately switched to provide a desired output voltage Vout and power factor correction to the input. Beginning at time t0, time period (a) begins. During time period (a), high side switches QAH and QBH are both turned off, with low side switches QAL and QBL both turned on. The corresponding drive signals 802*a*, 802*b*, 802*c* and 802*d* are illustrated in FIG. 8D. As a result, negative inductor current 842*a* flows form the AC source, through turned on switches QBL and QAL, through inductor LB, returning to the AC input source. This results in the increasingly negative inductor current 806, with a corresponding positive current 862 through switch QBL. The output voltage Vout appears across switches QAH (waveform 866) and QBH (waveform 867).

At time t1, when the inductor current reaches its peak value 807, switch QBL may be turned off, beginning time period (b) which extends from time t1 to time t2. During this interval, switch QAL remains on, and switches QAH, QBH, and QBL are all turned off. As a result, negative inductor current 842*b* flows from the AC input, through the intrinsic body diode of switch QBH, through the load, through switch QAL, returning to the AC input through boost inductor LB. Corresponding drive signals 802*a*, 802*b*, 802*c*, and 802*d* are illustrated in FIG. 8D. During time period (b), the inductor current 806 remains at its negative peak, but current flow transitions from flowing through switch QBL (waveform 862) to flowing through switch QBH (waveform 864). The output voltage continues to appear across switch QAH (waveform 866), but transitions from appearing across switch QBH (waveform 862) to appearing across switch QBL (waveform 869).

At time t2, switch QBH may be turned on in ZVS condition by virtue of the current 842*c* flowing through the intrinsic body diode of switch QBH. Current 842*c* will continue to flow as indicated in FIG. 8C, starting at the AC source, through now turned on switch QBH, through the load, through switch QAL, returning to the AC input via boost inductor LB. During time period (c), switches QBH and QAL are turned on, with switches QAH and QBL turned off. Corresponding drive waveforms 802*a*, 802*b*, 802*c*, and 802*d* are illustrated in FIG. 8D. Also illustrated in FIG. 8D, inductor current 806 decreases to zero and then to a slightly positive value 863. The output voltage continues to appear across switch QAH (waveform 866) and switch QBL (waveform 869).

Time period (d), corresponding to the brief interval around time t3, illustrates the reversal of current 842*f* (FIG. 8C). The reversed inductor current 842*f* flows from AC source, through switch QAL, backwards through the output load, through switch QBH, back to the AC input. During time period (d), switches QBH and QAL remain turned on, which switches QAH and QBL remain turned off. Corresponding drive signals 802*a*, 802*b*, 802*c*, and 802*d* are illustrated in FIG. 8D. After time t3, the positive current 842*e* continues to flow through boost inductor Lb and switch QAL, transitioning from flowing through the output/load to flowing through the intrinsic body diode of switch QBL, thereby returning to the AC input. This allows switch QBL to be turned on in a ZVS condition at time t4, which then allows for the inductor current 842*f* to again reverse, returning the cycle to time t5, which corresponds to time t0, i.e., the beginning of the negative half cycle.

Figure 9A:
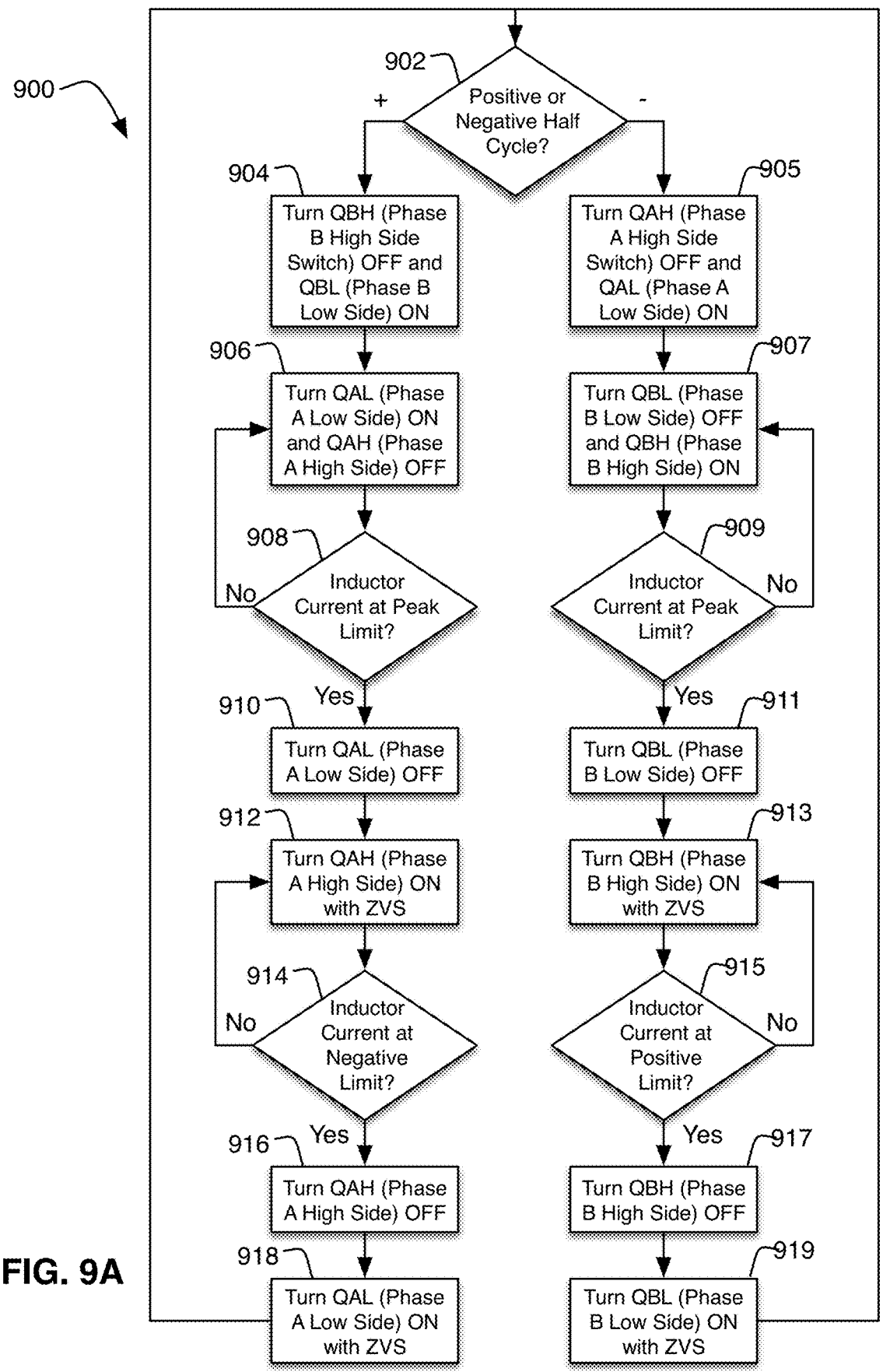
FIG. 9A illustrates a summary flow chart of the first switching sequence depicted in FIGS. 8A-8D.
Figure 9B:
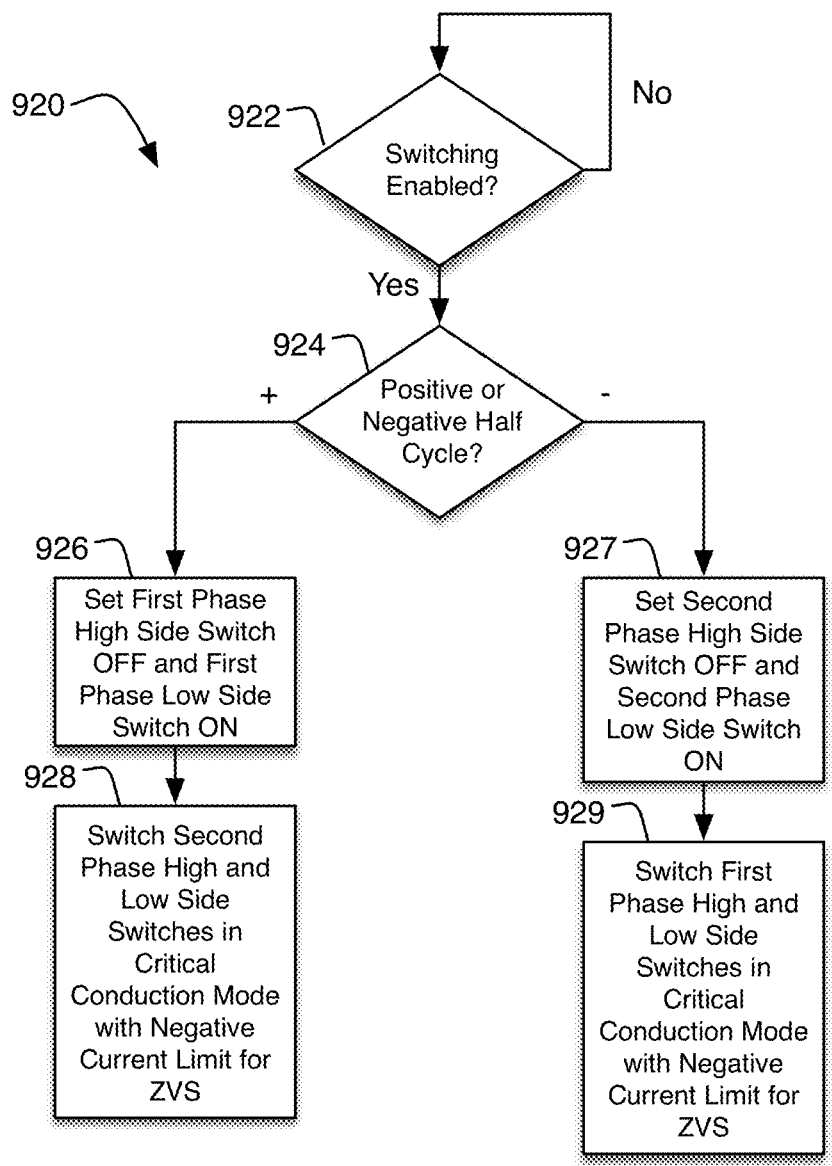
FIG. 9B illustrates a summary flow chart of the first switching sequence depicted in FIGS. 8A-8D.

FIGS. 9A and 9B illustrate summary flow charts of the first switching scheme described above with reference to FIGS. 8A-8D. More specifically, FIG. 9A depicts a flow chart 900 that begins with determining whether the AC input waveform is in the positive or negative half cycle (block 902). It should be appreciated that the flow chart 900 may include a preliminary step (not shown) of determining whether switching is enabled or disabled according to the discussion above with respect to FIGS. 2A-5. If the AC input waveform is in the positive half cycle, control passes to block 904 in which the phase B high side switch QBH is turned off, and phase B low side switch QBL is turned ON. These switches will remain in these positions for the duration of the positive half cycle.

Then, in block 906, phase A low side switch QAL may be turned on, and phase A high side switch QAH may be turned off. As will be explained in greater detail below, the QAL turn on transition may be a zero voltage switching (ZVS) transition. In any case, this switching configuration causes current to flow through the boost inductor, storing energy therein. Block 908 may monitor the inductor current to determine whether it has reached its predetermined peak current limit. If not, the switches may remain in position, causing the inductor current to continue to increase linearly as more energy is stored in the inductor. Otherwise, when it is determined by block 908 that the inductor current has reached its peak value, phase A low side switch may be turned off, diverting the inductor current to the load.

In addition to diverting energy to the load, this switching configuration will cause current to flow through the intrinsic body diode of phase A high side switch QAH, allowing switch QAH to be turned on in a ZVS condition, improving the circuit's operating efficiency. As the energy from the inductor is delivered to the load, the inductor current will continue to decrease linearly, which may be monitored in block 914. So long as the current remains above a predetermined negative current limit, the switches may be maintained in this position. When the inductor current reaches a predetermined negative current limit, as determined in block 914, phase A high side switch QAH may be turned off (block 916). Then, phase A high side switch QAL may be turned ON in a zero voltage switching condition, and the cycle may repeat for the duration of the positive half cycle of the AC input waveform (and for so long as switching remains enabled).

During the negative cycle of the AC input waveform, control from block 902 passes to block 905, in which phase A high side switch QAH is turned off and phase a low side switch QAL is turned on. Then, in block 907, phase B low side switch QBL is turned on and phase B high side switch QBH is turned off. As will be explained in greater detail below, the QBL turn on transition may be a zero voltage switching (ZVS) transition. This switch configuration establishes a negative current through the inductor that stores energy in the inductor. Block 909 may monitor the inductor current to determine whether it has reached a predetermined inductor current limit. If not, the switches may be left in position, continuing to store energy in the inductor. If so, then control passes to block 911, in which phase B low side switch QBL is turned off. This begins the transfer of energy from the boost inductor to the load, and also establishes a current flow condition that allows phase B high side switch QBH to be turned on in a zero voltage condition, improving operating efficiency of the circuit.

As the energy stored in the boost inductor is transferred to the load, the (negative) inductor current will continue decreasing. Block 915 may monitor the inductor current, waiting for a current reversal to a slightly positive value. Until this slightly positive current limit is reached, the switches may be left in their configuration. Once the positive current limit is reached, phase B high side switch QBH may be turned off (block 917), which sets up a condition in which phase B low side switch may be turned on in a ZVS condition. The cycle may repeat for the duration of the negative half cycle of the AC input waveform (and for so long as switching remains enabled).

FIG. 9B illustrates a further simplified flowchart 920 depicting and summarizing the same control operation. Initially, in block 922, it may be determined if switching is enabled (e.g., according to the techniques described above with respect to FIGS. 2A-5. If not, block 922 may continue to test for enabled switching, and, when switching is enabled, block 924 may determine whether the AC input waveform is currently in its negative or positive half cycle. If in the positive half cycle, control may proceed to block 926 in which the first phase high side switch may be turned off and the first phase low side switch may be turned on. Control may then pass to block 928, where the second phase high and low side switches may be alternately switched in critical conduction mode with negative current limits to achieve zero voltage switching. Alternatively, if in block 924 it is determined that the AC input source is in its negative half cycle, control may pass to block 927 in which the second phase high side switch may be turned off and the second phase low side switch may be turned on. Control may then pass to block 929 in which the first phase high and low side switches are alternately switched in critical conduction mode with a negative current limit to allow for zero voltage switching turn on transitions.

The preceding flow charts of FIGS. 9A and 9B may be implemented by any suitable controller, including analog control circuitry, digital control circuitry (including control circuitry using logic gates and similar elements or programmable processors, controllers, microcontrollers, etc.). In some embodiments, the controller may be implemented as hybrid analog/digital circuitry and may, in at least some embodiments, be implemented in an application specific integrated circuit.

Turning now to FIGS. 10A and 10B, the positive half cycle switching sequence for the second control scheme is illustrated. With reference to block (a) of FIG. 10A, beginning at time t0, high side switches QAH and QBH are turned on, with low side switches QAL and QBL turned off. Corresponding drive signals 1002a (QAH), 1002b (QAL), 1002c (QBH), and 1002d (QBL) are illustrated in FIG. 10B. As a result of this switch configuration, a positive inductor current 1040a flows from the AC source, through switch QAH, through switch QBH, back to the AC source. This current is a linearly increasing current as illustrated by waveform 1006 in FIG. 10B. Waveform 1062 illustrates a corresponding increasing current through switch QBH. As illustrated by waveforms 1066-1069, the converter output voltage Vout appears across switches QBH and QAL.

At time t1, when the inductor current iLB reaches the peak current limit 1007, switch QBH may be turned off. Current 1040b continues flowing through the boost inductor LB. Because QBH is turned off, the current flows through the load, returning to the AC source through the intrinsic body diode of low side switch QBL. Corresponding drive signals 1002a-1002d are illustrated in FIG. 10B, showing all switches except QAH turned off. As illustrated by waveforms 1062 (switch QBH current) and 1064 (switch QBL current), the inductor current (now also load current) transitions from switch QBH to QBL. Likewise, the output voltage transitions from appearing across switch QAL (voltage waveform 1068) and switch QBH (waveform 1067) to appearing across switch QAL (voltage waveform HH68) and switch QBL (waveform 1069).

The current 1040b flowing through the intrinsic body diode of switch QBL, allows switch QBL to be turned on in a ZVS condition at time t2. This begins time period (c), in which inductor current 1040c continues flowing through the boost inductor LB, through high side switch QAH, which remains turned on, through the load, returning to the AC source through the now turned on low side switch QBL. As illustrated in FIG. 10B, during the time period from t2 to t3 (i.e., time period (c)), drive signals 1002a and 1002d are high, corresponding to the turn on of switches QAH and QBL, and drive signals 1002b and 1002c are low, corresponding to the turn off of switches QAL and QBH. During this time period, energy stored in boost inductor LB is discharged to the load, as illustrated by the linearly decreasing inductor current 1006. This includes a corresponding decrease in the current through switch QBL, illustrated in waveform 1064. As in time period (b), the output voltage appears across switches QAL and QBL.

At time t3, the inductor current decreases to a negative current limit 1063 as discussed above. At this time, current 1040*d* is flowing in reverse through the inductor. The current flow path is thus from the AC source, through switch QBL, which remains on, through the load (in the reverse direction), through switch QAH, through boost inductor LB, back to the AC input source. Corresponding switch drive waveforms 1002*a*-1002*d* are shown in FIG. 10B. At time t3, low side switch QBL may be turned off causing the negative current 1040*e* to flow along the path indicated in block (e) of FIG. 10A. Specifically, the current continues flowing from the AC source, through the intrinsic body diode of high side switch QBH, through high side switch QAH (which remains turned on continuously), back though boost inductor LB to the AC source. The reverse current flowing through the body diode of high side switch QBH allows the switch to be turned on in a ZVS switching condition at time t4, beginning time period (f), which corresponds to time period (a) discussed above.

Turning now to FIGS. 10C and 10D, the negative half cycle switching sequence for the second control scheme is illustrated. During the negative half cycle of the second switching scheme, beginning at time t0, high side switches QAH and QBH are turned off, with low side switches QAL and QBL turned on. corresponding drive signals 1002*a*-1002*d* are illustrated in FIG. 10D. As a result of this switch configuration, inductor current 1042*a* flows form the AC source, through low side switches QBL and QAL, returning to the AC source via boost inductor LB. This results in a linearly increasing inductor current iLB (waveform 1006) that stores energy in the inductor. Waveform 1062 illustrates the corresponding increasing current through low side switch QBL. As illustrated by voltage waveforms 1066-1069, during this first time period (a), between time t0 and t1, the output voltage appears across high side switches QAH and QBH.

At time t1, when the inductor current iLB reaches is programmed peak limit 1007, low side switch QBL may be turned off, beginning time period (b). As a result, current 1042*b* flows from the AC source, through the intrinsic body diode of high side switch QBH, through the load, through low side switch QAL (which remains turned on throughout the negative half cycle), returning to the AC source via boost inductor LB. Additionally, current transitions from flowing through low side switch QBL to high side switch QBH, as illustrated by waveforms 1062 and 1064. Correspondingly, the output voltage transitions from appearing across high side switches QAH and QBH to appearing across high side switch QAH and low side switch QBL, as illustrated by voltage waveforms 1066-1069.

At time t2, with current 1042*b* flowing through the intrinsic body diode of high side switch QBH, switch QBH may be turned ON in a zero voltage condition, marking the beginning of time period (c). During this time period, current continues to flow from the AC input, through high side switch QBH, through the load, through low side switch QAL, returning to the AC source via boost inductor LB. Corresponding drive voltage waveforms 1002*a*-1002*d* are illustrated in FIG. 10D. As illustrated by current waveform 1006, the inductor current iLB decreases, delivering the energy stored in boost inductor LB to the load. Additionally during this period, the output voltage remains across high side switch QAH and low side switch QBL, as illustrated by voltage waveforms 1066-1069.

Boost inductor current iLB continues decreasing until time t3, at which it reaches a negative (actually positive in this case) current limit 1063. At time t3, current 1042*d* flows from the AC source, through inductor LB, through low side switch QAL, which remains turned on throughout, through the load (in a reverse direction), returning to the AC source via high side switch QBH. High side switch QBH may be turned off at this time. Corresponding drive signals 1002*a*-1002*d* are illustrated in FIG. 10D. At time t3, the current begins to transition from high side switch QBH, back to low side switch QBL, as illustrated by current waveforms 1062 and 1064. Likewise, the output voltage transitions form appearing across high side switch QAH and low side switch QBL to appearing across high side switches QAH and QBH, as illustrated by voltage waveforms 1066-1069.

The turn off switch QBH results in the current flow path 1042*e* illustrated in FIG. 10C. Current 1042*e* continues to flow through boost inductor LB, through low side switch QAL, which remains turned on throughout, through the intrinsic body diode of low side switch QBL, returning to the AC input source. The current through the body diode of switch QBL allows low side switch QBL to be turned on in a ZVS switching condition at time t4, which begins time period (f), which corresponds to time period (a) discussed above. Corresponding waveforms are illustrated in FIG. 10D.

Figure 11A:
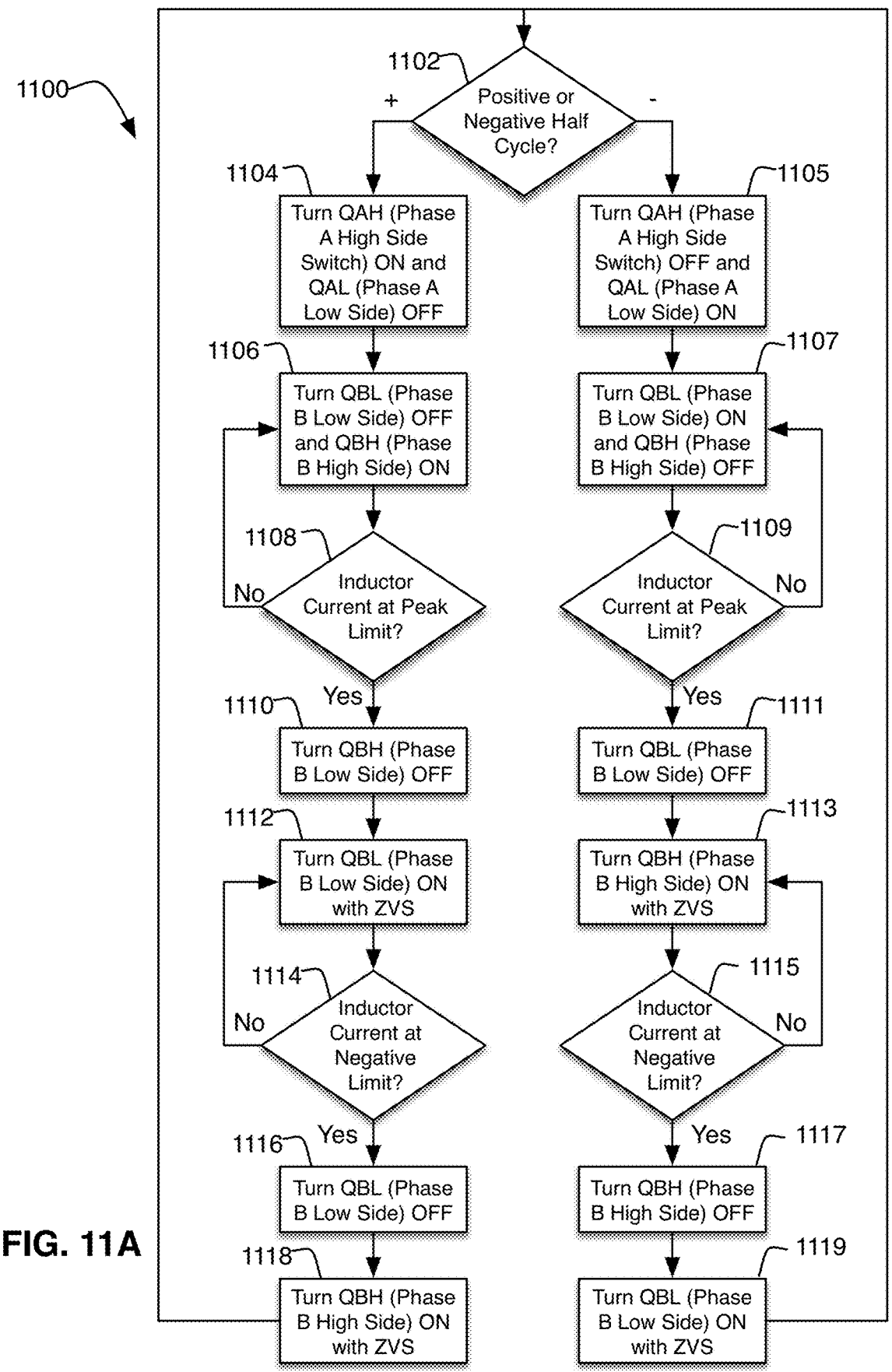
FIG. 11A illustrates a summary flow chart of the second switching sequence depicted in FIGS. 10A-10D.
Figure 11B:
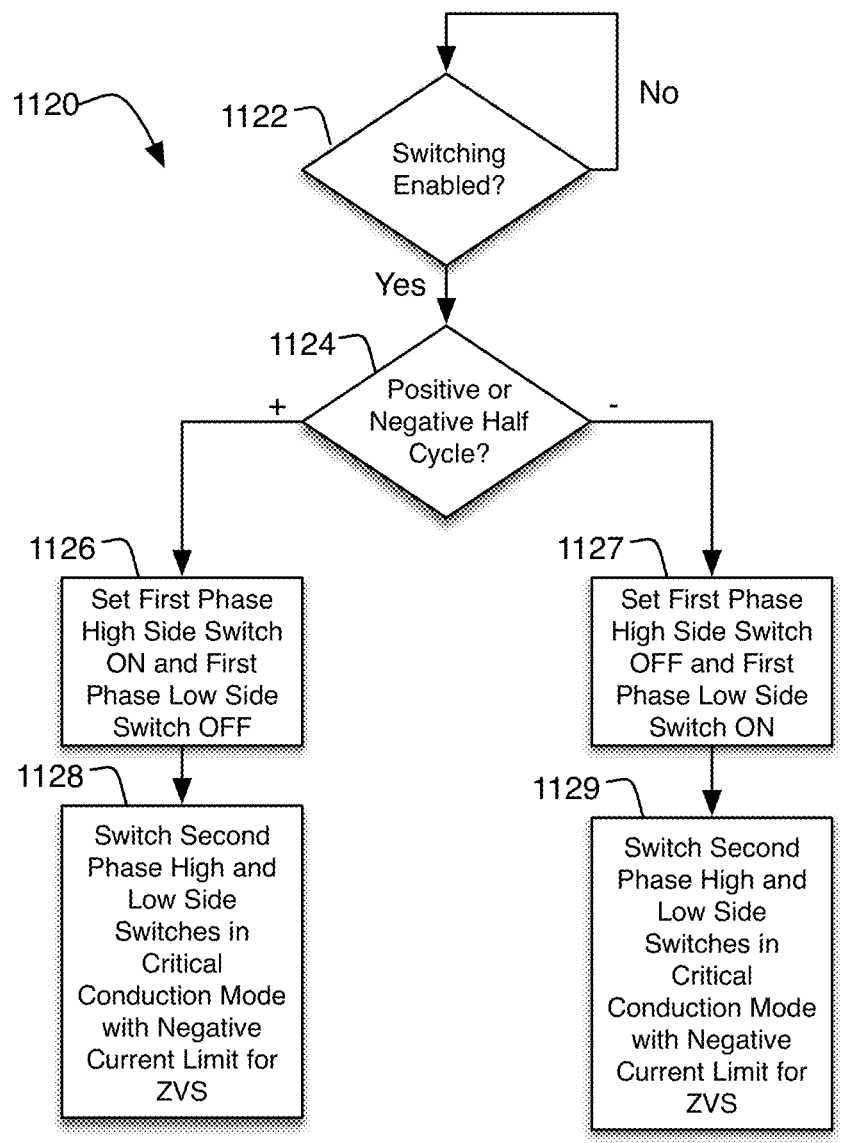
FIG. 11B illustrates a summary flow chart of the second switching sequence depicted in FIGS. 10A-10D.

FIGS. 11A and 11B illustrate summary flow charts of the second switching scheme described above with reference to FIGS. 10A-10D. More specifically, FIG. 11A depicts a flow chart 1100 that begins with determining whether the AC input waveform is in the positive or negative half cycle (block 1102). It should be appreciated that the flow chart 1100 may include a preliminary step (not shown) of determining whether switching is enabled or disabled according to the discussion above with respect to FIGS. 2A-5. If the AC input waveform is in the positive half cycle, control passes to block 1104 in which the phase A high side switch QAH is turned on, and phase A low side switch QAL is turned off. These switches will remain in these positions for the duration of the positive half cycle.

Then, in block 1106, phase B low side switch QBL may be turned off, and phase B high side switch QBH may be turned on. As will be explained in greater detail below, the QBH turn on transition may be a zero voltage switching (ZVS) transition. In any case, this switching configuration causes current to flow through the boost inductor, storing energy therein. Block 1108 may monitor the inductor current to determine whether it has reached its predetermined peak current limit. If not, the switches may remain in position, causing the inductor current to continue to increase linearly as more energy is stored in the inductor. Otherwise, when it is determined by block 1108 that the inductor current has reached its peak value, phase B high side switch may be turned off, diverting the inductor current to the load.

In addition to diverting energy to the load, this switching configuration will cause current to flow through the intrinsic body diode of phase B low side switch QBL, allowing switch QBL to be turned on in a ZVS condition, improving the circuit's operating efficiency. As the energy from the inductor is delivered to the load, the inductor current will continue to decrease linearly, which may be monitored in block 1114. So long as the current remains above a predetermined negative current limit, the switches may be maintained in this position. When the inductor current reaches a predetermined negative current limit, as determined in block 1114, phase B low side switch QBH may be turned off (block 1116). Then, phase B high side switch QBH may be turned ON in a zero voltage switching condition, and the cycle may repeat for the duration of the positive half cycle of the AC input waveform (and for so long as switching remains enabled).

During the negative cycle of the AC input waveform, control from block 1102 passes to block 1105, in which phase A high side switch QAH is turned off and phase A low side switch QAL is turned on. Then, in block 1107, phase B low side switch QBL is turned on and phase B high side switch QBH is turned off. As will be explained in greater detail below, the QBL turn on transition may be a zero voltage switching (ZVS) transition. This switch configuration establishes a negative current through the inductor that stores energy in the inductor. Block 1109 may monitor the inductor current to determine whether it has reached a predetermined inductor current limit. If not, the switches may be left in position, continuing to store energy in the inductor. If so, then control passes to block 1111, in which phase B low side switch QBL is turned off. This begins the transfer of energy from the boost inductor to the load, and also establishes a current flow condition that allows phase B high side switch QBH to be turned on in a zero voltage condition, improving operating efficiency of the circuit.

As the energy stored in the boost inductor is transferred to the load, the (negative) inductor current will continue decreasing. Block 1115 may monitor the inductor current, waiting for a current reversal to a slightly positive value. Until this slightly positive current limit is reached, the switches may be left in their configuration. Once the positive current limit is reached, phase B high side switch QBH may be turned off (block 1117), which sets up a condition in which phase B low side switch QBL may be turned on in a ZVS condition (block 1119). The cycle may repeat for the duration of the negative half cycle of the AC input waveform (and for so long as switching remains enabled).

FIG. 11B illustrates a further simplified flowchart 1120 depicting and summarizing the same control operation. Initially, in block 1122, it may be determined if switching is enabled (e.g., according to the techniques described above with respect to FIGS. 2A-5. If not, block 1122 may continue to test for enabled switching, and, when switching is enabled, block 1124 may determine whether the AC input waveform is currently in its negative or positive half cycle. If in the positive half cycle, control may proceed to block 1126 in which the first phase high side switch may be turned on and the first phase low side switch may be turned off. Control may then pass to block 1128, where the second phase high and low side switches may be alternately switched in critical conduction mode with negative current limits to achieve zero voltage switching. Alternatively, if in block 1124 it is determined that the AC input source is in its negative half cycle, control may pass to block 1127 in which the first phase high side switch may be turned off and the first phase low side switch may be turned on. Control may then pass to block 1129 in which the second phase high and low side switches are alternately switched in critical conduction mode with a negative current limit to allow for zero voltage switching turn on transitions.

The preceding flow charts of FIGS. 11A and 11B may be implemented by any suitable controller, including analog control circuitry, digital control circuitry (including control circuitry using logic gates and similar elements or programmable processors, controllers, microcontrollers, etc.). In some embodiments, the controller may be implemented as hybrid analog/digital circuitry and may, in at least some embodiments, be implemented in an application specific integrated circuit.

Described above are various features and embodiments relating to boost/PFC converters Such circuits may be used in a variety of applications but may be particularly advantageous when used in conjunction with computer power supplies, AC-DC converters/adapters (colloquially known as chargers or external power bricks) for portable electronic devices, small form factor computers, and the like. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power converter, comprising:
   an input configured to receive an AC input voltage;
   a rectifier configured to convert the AC input voltage into a rectified AC input voltage;
   a boost converter configured to receive the rectified AC input voltage and deliver a regulated output voltage; and
   a control circuit coupled to the boost converter and configured to:
   monitor the regulated output voltage, an input current of the boost converter, and the rectified AC input voltage;
   switch at least one switching device of the boost converter to deliver the regulated output voltage while maintaining the input current in phase with the rectified AC input voltage; and
   selectively enable switching of the boost converter responsive to a determination that the rectified AC input voltage is greater than a threshold voltage and selectively disable switching of the boost converter responsive to a determination that the rectified AC input voltage is less than the threshold voltage.

2. The power converter of claim 1 wherein the boost converter comprises:
   a boost inductor having a first terminal coupled to the rectified AC input voltage;
   a boost switching device coupled between a second terminal of the boost inductor and ground; and
   a boost rectifier having a first terminal coupled to the second terminal of the boost inductor and a second terminal coupled to an output of the converter.

3. The power converter of claim 2 wherein the boost rectifier is a rectifier switching device switched complementarily to the boost switching device.

4. The power converter of claim 3 wherein the rectifier switching device is switched complementarily to the boost switching device with a dead time.

5. The power converter of claim 1 wherein the threshold voltage is zero.

6. The power converter of claim 1 wherein the control circuit is configured to selectively enable and disable switching of the boost converter using an active burst mode signal having a frequency lower than a switching frequency of the boost converter.

7. The power converter of claim 6 wherein the active burst mode signal is zero if the input voltage is below the threshold voltage.

8. The power converter of claim 1 wherein the control circuit is configured to operate at least one switching device of the boost converter in a zero voltage switching condition.

9. The power converter of claim 8 further comprising a zero voltage switching capacitor coupled to the boost converter, wherein the control circuit is configured to control timing of at least one switching device of the boost converter to allow a reverse current through the at least one switching device prior to turn on of the at least one switching device, thereby allowing zero voltage switching of the at least one switching device.

10. An AC/DC converter circuit comprising:
a first phase including a first high side switch having a first terminal coupled to a DC output terminal of the converter and a second terminal coupled to a first AC input terminal of the converter and a first low side switch having a first terminal coupled to the second terminal of the first high side switch and a second terminal coupled to ground;
a second phase including a second high side switch having a first terminal coupled to the DC output terminal of the converter and a second terminal coupled to a second AC input terminal of the converter and a second low side switch having a first terminal coupled to the second terminal of the second high side switch and a second terminal coupled to ground; and
at least one inductor coupled between at least one of the first and second AC input terminals and an AC input source; and
a controller configured to operate the first and second switch phases according to a switching sequence during a positive half cycle of the AC input voltage and operate the first and second switch phases according to a second switching sequence during a negative half cycle of the AC input voltage;
wherein the controller is further configured to selectively enable switching of the first and second switch phases responsive to a determination that an instantaneous value of the AC input voltage is greater than a threshold voltage and selectively disable switching of the boost converter responsive to a determination that the instantaneous value of the AC input voltage is less than the threshold voltage.

11. The AC/DC converter circuit of claim 10 wherein the at least one inductor comprises a first inductor coupled between the first AC input terminal and the AC input source and a second inductor coupled between the second AC input terminal and the AC input source.

12. The AC/DC converter of claim 10 wherein the switching sequence during a positive half cycle of the AC input voltage comprises:
turning the first high side switch of the first phase off;
turning the first low side switch of the first phase on; and
switching the second high side switch and second low side switch of the second phase in a critical conduction mode with a negative current limit, thereby achieving zero voltage switching of the second high side switch and second low side switch.

13. The AC/DC converter of claim 10 wherein the switching sequence during a negative half cycle of the AC input voltage comprises:
turning the second high side switch of the second phase off;
turning the second low side switch of the second phase on; and
switching the first high side switch and first low side switch of the second phase in a critical conduction mode with a negative current limit, thereby achieving zero voltage switching of the first high side switch and first low side switch.

14. The AC/DC converter of claim 10 wherein the switching sequence during a positive half cycle of the AC input voltage comprises:
turning the first high side switch of the first phase on;
turning the first low side switch of the first phase off; and
switching the second high side switch and second low side switch of the second phase in a critical conduction mode with a negative current limit, thereby achieving zero voltage switching of the second high side switch and second low side switch.

15. The AC/DC converter of claim 10 wherein the first switching sequence during a negative half cycle of the AC input voltage comprises:
turning the first high side switch of the first phase on;
turning the first low side switch of the first phase off; and
switching the second high side switch and second low side switch of the second phase in a critical conduction mode with a negative current limit, thereby achieving zero voltage switching of the second high side switch and second low side switch.

16. A method of operating an AC/DC converter, the method comprising:
monitoring a regulated output voltage, an input current, and an input voltage of the converter;
selectively switching at least one switching device to deliver the regulated output voltage while maintaining the input current in phase with the input voltage; and
selectively enabling switching of the at least one switching device responsive to a determination that input voltage is greater than a threshold voltage and selectively disabling switching of the at least one switching device responsive to a determination that the input voltage is less than the threshold voltage.

17. The method of claim 16 wherein the threshold voltage is zero.

18. The method of claim 16 wherein selectively enabling switching and selectively disabling switching of the at least one switching device comprises using an active burst mode signal having a frequency lower than a switching frequency of the boost converter.

19. The method of claim 16 wherein selectively switching at least one switching device comprises switching the at least one switching device in a zero voltage switching condition.

* * * * *